(12) United States Patent
Kitou et al.

(10) Patent No.: US 6,731,828 B2
(45) Date of Patent: May 4, 2004

(54) WAVEGUIDE-TYPE OPTICAL SIGNAL PROCESSING CIRCUIT

(75) Inventors: Tsutomu Kitou, Atsugi (JP); Yasuyuki Inoue, Mito (JP); Manabu Oguma, Yamato (JP); Takayuki Mizuno, Yamato (JP); Yoshinori Hibino, Mito (JP); Masaki Koutoku, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 47 days.

(21) Appl. No.: 10/185,817

(22) Filed: Jun. 28, 2002

(65) Prior Publication Data

US 2003/0012479 A1 Jan. 16, 2003

(30) Foreign Application Priority Data

Jul. 4, 2001 (JP) ........................ 2001-203833
Aug. 8, 2001 (JP) ........................ 2001-241370

(51) Int. Cl.[7] .............................................. G02B 6/12
(52) U.S. Cl. ........................... 385/14; 385/15; 385/24; 385/31
(58) Field of Search ......................... 385/14, 15, 24, 385/31

(56) References Cited

U.S. PATENT DOCUMENTS

| | | | |
|---|---|---|---|
| 5,701,372 A | 12/1997 | Magel et al. | |
| 5,926,589 A | 7/1999 | Gaeta | |
| 5,953,468 A | 9/1999 | Finnila et al. | |
| 2003/0202743 A1 | * 10/2003 | Shibata | 385/27 |

FOREIGN PATENT DOCUMENTS

| | | |
|---|---|---|
| EP | 0 438 237 A2 | 7/1991 |
| EP | 0 724 173 A1 | 7/1996 |
| EP | 0 733 920 A2 | 9/1996 |
| JP | 09297230 A | 11/1997 |

OTHER PUBLICATIONS

Kaname Jinguji, *Synthesis of Coherent Two–Port Lattice–Form Optical Delay–Line Circuit*, Journal of Lightwave Technology, vol. 13, No. 1, Jan. 1995.
Abstract of Japanese Publication No. 11344629, published Dec. 14, 1999.
S. Suzuki et al., *Large–Scale and High–Density Planar Lightwave Circuits with High $\Delta$ $GeO_2$–Doped Silica Waveguides*, Electronics Letters, vol. 28, No. 20, Sep. 24, 1992, pp. 1863–1864.
T. Saida, et al., *Silica–based 2×2 Multimode Interference Coupler with Arbitrary Power Splitting Ratio*, Electronics Letters, vol. 35, No. 23, Nov. 11, 1999, pp. 2031–2033.

* cited by examiner

Primary Examiner—Rodney Bovernick
Assistant Examiner—Sung Pak
(74) Attorney, Agent, or Firm—Workman Nydegger

(57) ABSTRACT

It is an object of the present invention to reduce the size of a circuit and the adverse effects of fabrication errors, while increasing yield. Signal light incident on a circuit through input waveguides propagates from the exterior to interior of the circuit while rotating counterclockwise. The signal light passes through a point of inflection in the center of the circuit, subsequently propagate clockwise from the interior to exterior of the circuit, and then exit output waveguides. Two arms constituting a delay circuit and optical couplers can be integrated together at such an interval that they are not coupled together. Therefore, the size of the circuit can be reduced compared to the prior art.

8 Claims, 39 Drawing Sheets

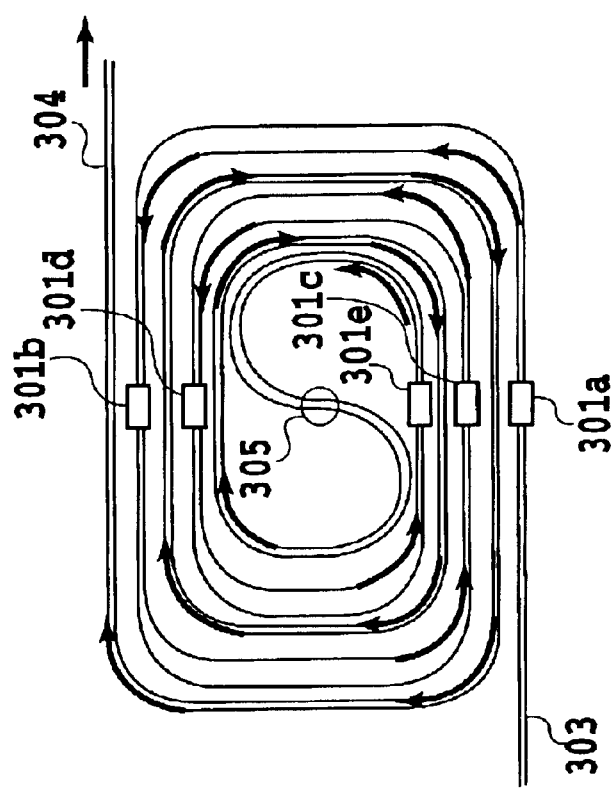
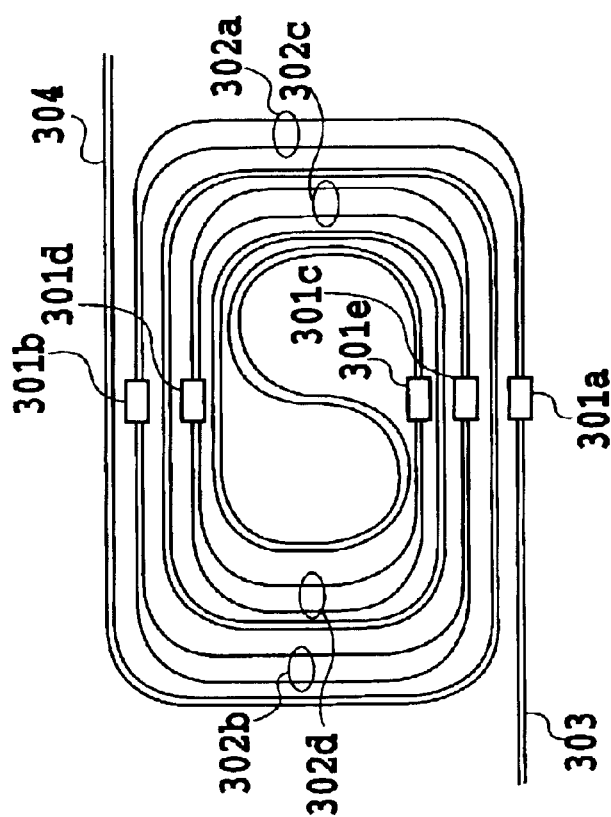
FIG. 3B
FIG. 3A

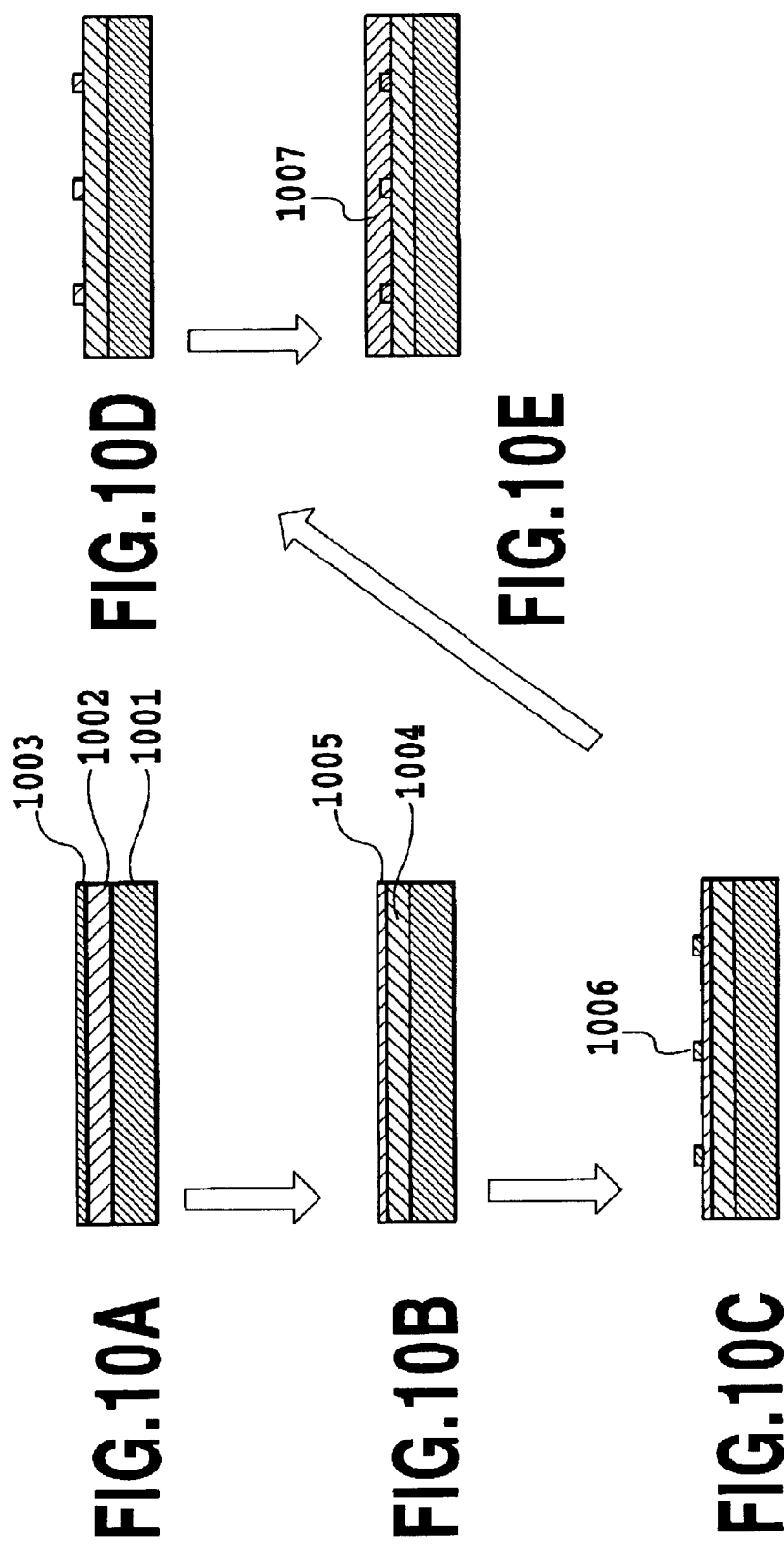

WAVEGUIDE-TYPE OPTICAL SIGNAL PROCESSING CIRCUIT

This application is based on Japanese Patent Application Nos. 2001-203833 filed Jul. 4, 2001 and 2001-241370 filed Aug. 8, 2001, the contents of which are incorporated hereinto by reference.

BACKGROUND OF THE INVENTION

1. Field of the Invention

The present invention relates to a waveguide-type optical signal processing circuit, and more specifically, to a waveguide-type optical signal processing circuit spirally arranged in a lattice-form circuit having optical couplers and delay circuits alternately cascaded together.

2. Description of the Related Art

Various efforts are being made to develop a wavelength division multiplexing systems using a plurality of optical wavelengths in order to increase communication capacity. In such a wavelength division multiplexing system, a lattice-form circuit is widely used. The optical filter is used in a) a wavelength multiplexing circuit that operates in a transmitter to multiplexes optical signals with a plurality of wavelengths, b) a wavelength demuliplexing circuit that operates in a receiver to demultiplexes the signals into different ports, c) an equalizing circuit in an optical amplifier which amplifies attenuated optical signals, d) a dispersion equalizer that equalizes dispersion of a group delay, and the like.

FIG. 1 shows the configuration of a lattice-form circuit. Signal light incident on input waveguides 103 passes through an optical coupler 101a. Then, one of the signal lights has its phase delayed by a delay circuit 102a. Subsequently, the signal lights are transmitted to an optical coupler 101b, where they are multiplexed so as to interfere with each other. The lattice-form optical filter uses a cascaded configuration of optical couplers and delay circuits to repeatedly multiplex signal lights so that the lights interfere with each other, thereby processing the optical signal.

FIG. 2A shows the entire configuration of a conventional lattice-form circuit. FIG. 2B shows this configuration in further detail. The illustrated lattice-form circuit is a 4-stage lattice-form circuit composed of five optical couplers 201a, 201b, 201c, 201d, and 201e and four delay circuits 202a, 202b, 202c, and 202d.

Provided that the optical waveguide has a radius of curvature R and a pitch S and the delay circuits have an optical path length difference $\Delta L$, the 1st stage delay circuit has a size of $(2R+S) \times (R+\Delta L/2)$, as shown in FIG. 2B. Accordingly, the lattice-form circuit has a size proportional to the number of stages N and which can be expressed as $N(2R+S) \times (2R+Lc+\Delta L)$, as shown in FIG. 2A. Here, Lc denotes the length of an optical coupler. That is, the circuit size increases in proportion to the number of stages according to a proportion constant substantially double the radius of curvature R. Consequently, the number of stages that can be laid out is markedly restricted.

Further, as the number of stages increases, more couplers and delay circuits are arranged at a pitch of $(2R+S)$. As a result, the entire circuit is prone to be affected by a fabrication error in the wafer. Furthermore, if a half waveplate is inserted into a symmetrical axis of each of the arms of each delay circuit, the groove must be diced in proportion to the number of stages, and the half waveplate must be independently inserted into each arm. This operation is inefficient.

In a conventional lattice-form circuit with a large number of stages, the delay circuits are arranged at a pitch substantially double the radius of curvature R. Accordingly, a large circuit size is required, and yield may decrease in connection with the increase in circuit scale. Further, since the entire circuit is prone to be affected by a fabrication error, the characteristics of the circuit may be degraded. Furthermore, the operation of inserting half waveplates is inefficient.

On the other hand, known optical couplers include directional couplers, Y-branches, and MMIs (Multi Mode Interference couplers). The directional coupler is often used for 2 lights interferometer owing to its very small excess loss. Ideally, an optical divider/combiner used in a conventional optical circuit such as an optical switch of a 2 lights interferometer or a Mach-Zehnder interferometer is desired to have a branching ratio of 50%. For example, the optical divider/combiner described in Japanese Patent Application Laid-Open No. 11-344629 (1999) has a high yield with a small loss and a branching ratio very close to 50%.

However, the branching ratio required for the optical divider/combiner frequently used in the lattice-form circuit is not limited to 50%. If the branching ratio deviates from the desired value, the characteristics of the optical circuit such as excess loss, optical crosstalk, and dispersion value may be significantly degraded. Thus, the conventional dispersion equalizer uses tunable couplers that control the branching ratio of each optical divider/combiner after the optical circuit has been fabricated. This increases the number of steps required to fabricate the optical circuit as well as chip size and requires a power supply, a control and regulation system, and the like which are used to operate the tunable couplers. Therefore, it has been difficult to implement a practical dispersion equalizer.

As described above, the lattice-form circuit includes a large number of optical couplers, so that if each optical coupler is large, the entire optical circuit may have a large size, the yield of a single wafer may decrease to increase costs, or other problems may occur. The optical coupler is required to reduce a fluctuation in branching ratio, losses, and polarization, as well as its size.

SUMMARY OF THE INVENTION

It is thus an object of the present invention to provide a waveguide-type optical signal processing circuit which has a reduced circuit size, which is unlikely to be affected to be fabrication errors, and which enables a high yield to be achieved.

It is another object of the present invention to provide an optical coupler that uses directional couplers with a very small excess loss to reduce a variation in branching ratio due to a fabrication error and the polarization dependence of the branching ratio.

To attain these objects, the present invention provides a waveguide-type optical signal processing circuit having lattice-form circuits each comprising optical couplers and delay circuits alternately cascaded together using optical waveguides each composed of a core formed on a substrate to guide signal light and a clad arranged around the core and having a lower refractive index than the core, the delay circuit being connected to the corresponding optical coupler and composed of two arms, the lattice-form circuit comprising an input waveguide connected to the leading optical coupler and an output waveguide connected to the trailing optical coupler connected to the last delay circuit, wherein the series of lattice-form circuits are arranged in a form in which two spirals are combined together on the substrate so as not to cross each other and coupled together in the middle thereof, the optical waveguides, each of which is composed of two arms, are arranged so as to extend halfway around the respective spirals, and an end of the input waveguide which is not connected to the leading optical coupler and an end of the output waveguide which is not connected to the trailing optical coupler extend outward from the spirals.

Further, the optical couplers have a first and second optical waveguides and four directional couplers formed by arranging the first and second optical waveguides close to each other. The optical couplers are configured so as to couple together signal lights with a wavelength λ which are incident on the first and second optical waveguides or branch a signal light with the wavelength λ which is incident on the first or second optical waveguide. The optical couplers are configured so that for an optical path length difference ΔL1 for the first and second optical waveguides between the first and second directional couplers with respect to the signal light incidence side, an optical path length difference ΔL2 for the first and second optical waveguides between the second and third directional couplers with respect to the signal light incidence side, and an optical path length difference ΔL3 for the first and second optical waveguides between the third and fourth directional couplers with respect to the signal light incidence side, ΔL1=−ΔL3=λ/4 and |ΔL2|<2λ.

The above and other objects, effects, features and advantages of the present invention will become more apparent from the following description of embodiments thereof taken in conjunction with the accompanying drawings.

BRIEF DESCRIPTION OF THE DRAWINGS

FIG. 3A is a circuit layout diagram of a lattice-form circuit in a waveguide-type optical signal processing circuit according to the present invention;

FIG. 3B is a diagram showing propagation of signal light in the lattice-form circuit;

FIGS. 10A to 10E are process diagrams showing a method of fabricating a waveguide according to the present invention;

DETAILED DESCRIPTION OF PREFERRED EMBODIMENTS

Figure 1:
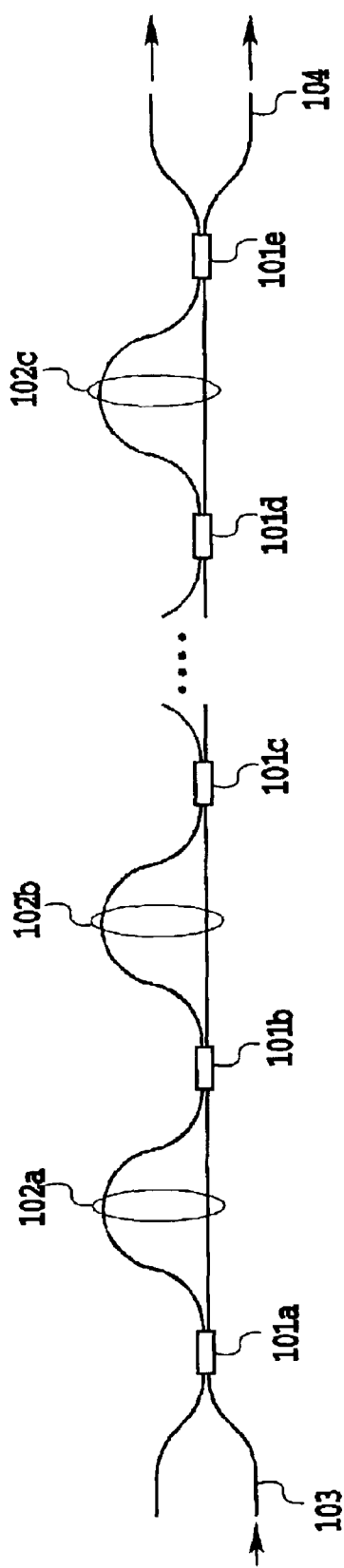
FIG. 1 is a diagram showing the configuration of a conventional lattice-form circuit.
Figures 2A, 2B:
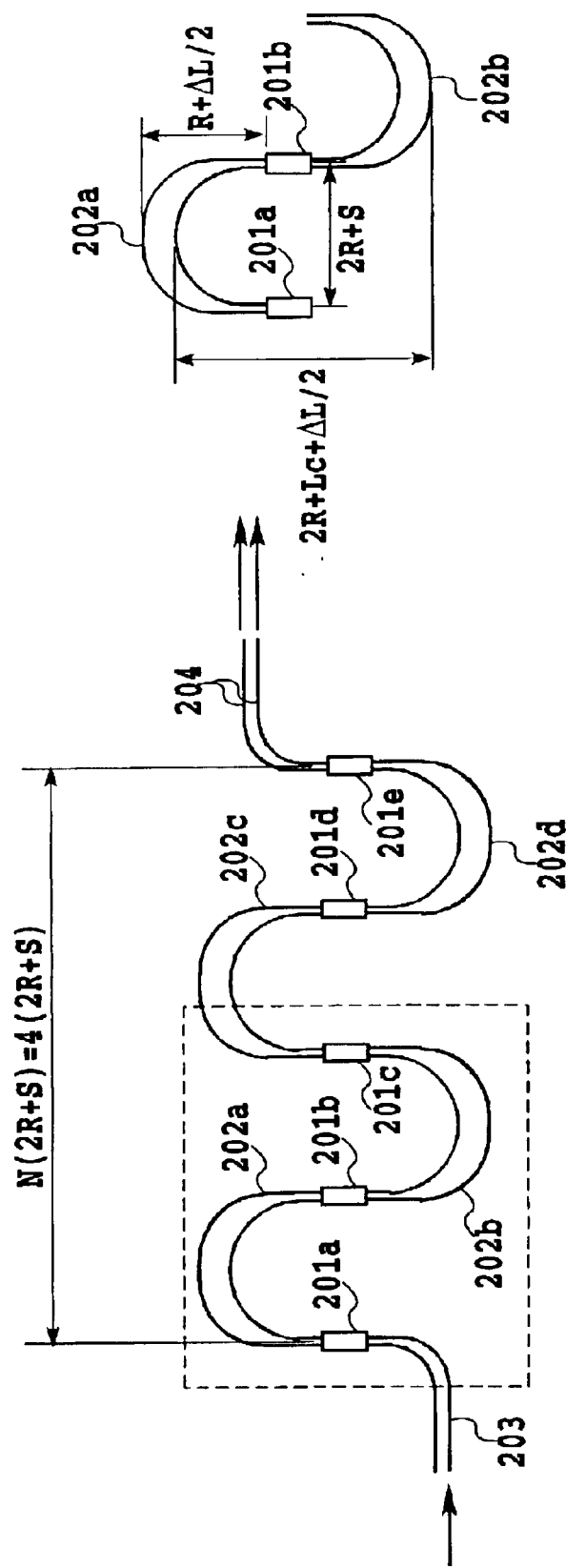
FIG. 2A is a diagram showing the entire conventional lattice-form circuit.
FIG. 2B is a diagram showing the conventional lattice-form circuit in further detail.

Embodiments of the present invention will be described below with reference to the drawings.

FIG. 3A shows the layout of a lattice-form circuit in a waveguide-type optical signal processing circuit according to the present invention. FIG. 3B shows propagation of signal light in the lattice-form circuit. The lattice-form circuit comprises optical couplers 301a, 301b, 301c, 301d, and 301e and delay circuits 302a, 302b, 302c, and 302d connected to the respective optical couplers and each composed of a waveguide including two arms, the optical couplers and delay circuits being alternately cascaded together, as well as an input waveguide 303 connected to the leading optical coupler 301a and an output waveguide 304 connected to the trailing optical coupler 301e.

With this configuration, as shown in FIG. 3B, signal light incident on the circuit through the input waveguide 303 propagates from the interior to exterior of the circuit while rotating counterclockwise. The signal light passes through a point of inflection 305 in the center of the circuit, subsequently propagates clockwise from the interior to exterior of the circuit, and then exits the output waveguide 304.

That is, the series of lattice-form circuits are arranged so that two spirals are combined together in the center of a substrate so as not cross each other and so that the optical couplers, each of which is composed of two arms, extend halfway around the respective spirals. An end of the input waveguide 303 which is connected to the leading optical coupler 301a and an end of the output waveguide 304 which is connected to the trailing optical coupler 301e are configured so as to extend outward from the respective spirals. Thus, the two arms constituting the delay circuit and the optical couplers can be integrated together at such an interval that they are not coupled together, thereby enabling the circuit to be miniaturized compared to the prior art.

In the above description of the waveguide-type optical signal processing circuit, one of the spirals is composed of an input waveguide, an optical coupler, and a delay circuit, whereas the other is an output waveguide. However, conversely, one of the spirals may be an input waveguide, whereas the other may be composed of an optical coupler, a delay circuit, and an output waveguide.

Figures 4A, 4B:
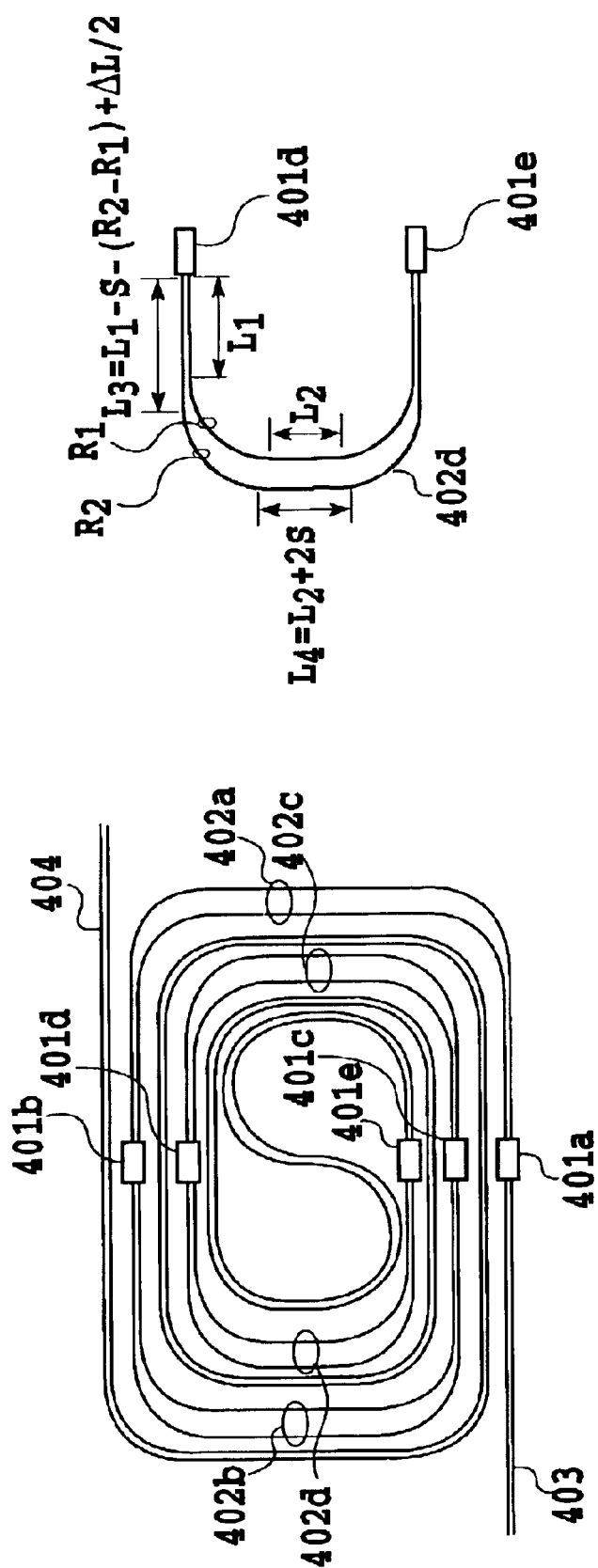
FIG. 4A is a circuit layout diagram of delay circuits constituting a lattice-form circuit according to the present invention.
FIG. 4B is a diagram showing the delay circuit constituting the lattice-form circuit.

FIG. 4A shows a circuit layout of delay circuits constituting a lattice-form circuit according to the present invention. FIG. 4B is a diagram showing the delay circuit in further detail. The lattice-form circuit is composed of an input waveguide 403, optical couplers 401a, 401b, 401c, 401d, and 401e, delay circuits 402a, 402b, 402c, and 402d having a fixed optical path length difference ΔL, and an output waveguide 404.

The delay circuits 402d extend halfway around the respective spirals. The two optical couplers 401d and 401e located at the respective ends of one of the delay circuits 402d are arranged opposite each other across the substantial center of the spiral. All optical couplers 401a, 401b, 401c, 401d, and 401e are configured to be arranged in a line.

To spirally arrange the delay circuits so that the waveguides will not cross each other, it is necessary to provide a small inner delay circuit and a large outer delay circuit. The delay circuits in the present invention allow the lengths L1 and L2 of straight portions of the shorter arm thereof to be arbitrarily set while maintaining the fixed optical path length difference ΔL, thereby preventing the waveguide from crossing each other, as shown in FIG. 4B.

Figure 5A:
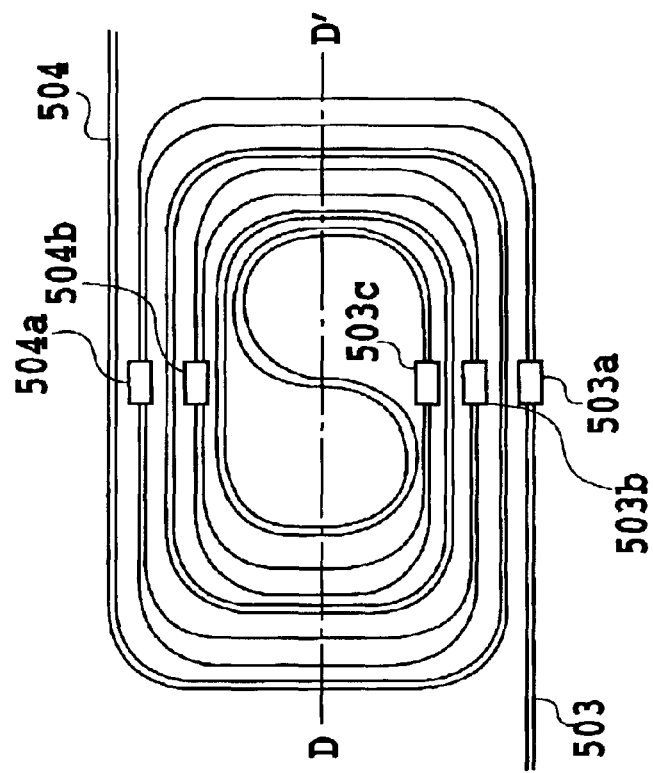
FIG. 5A is a circuit layout diagram illustrating the symmetry of the arrangement of the delay circuits of a lattice-form circuit according to the present invention.
Figure 5B:
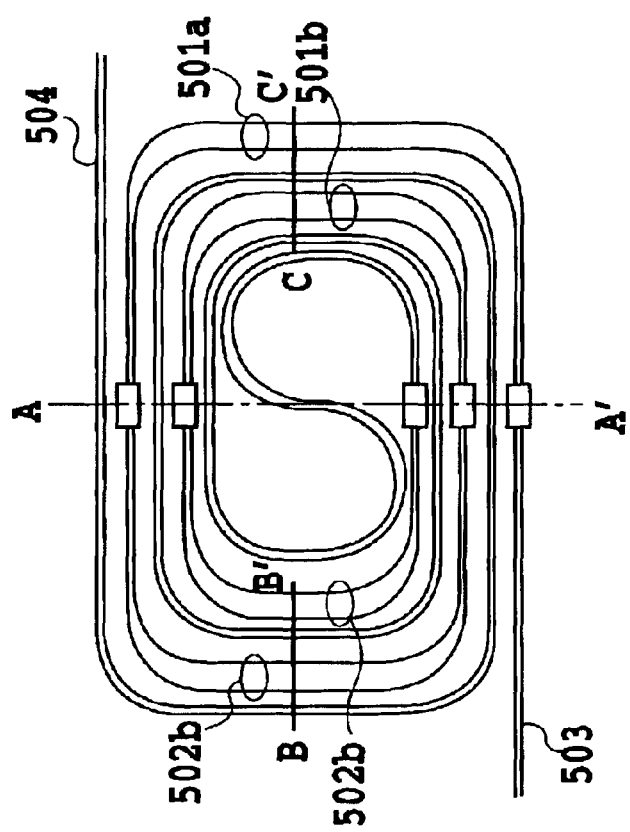
FIG. 5B is a circuit layout diagram illustrating the arrangement of optical couplers of a lattice-form circuit.

The symmetry of the lattice-form circuit according to the present invention will be described. FIG. 5A shows a circuit layout of delay circuits, and FIG. 5B shows a circuit layout of optical couplers. A lattice-form circuit is composed of an input waveguide 503, delay circuits 501a, 501b, 502a, and 502b, optical couplers 503a, 503b, 503c, 504a, and 504b, and an output waveguide 504.

The delay circuits 501a, 501b, 502a, and 502b are laterally symmetrically arranged with respect to an axis of symmetry AA'. Thus, half waveplates can be inserted into grooves BB' and CC', respectively, in order to avoid polarization dependence.

The group of optical couplers 503a and 503b and the group of optical couplers 504a, 504b, and 504c are integrated and symmetrically arranged with respect to an axis of symmetry DD'. This suppresses degradation of characteristics attributed to fabrication errors in a wafer.

Figure 6B:
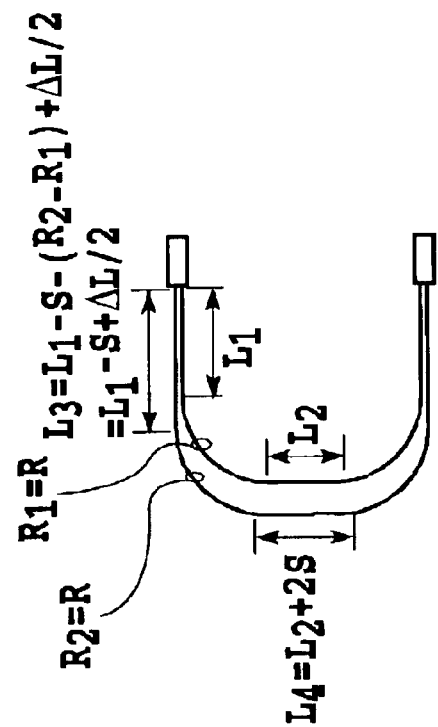
FIG. 6B is a diagram illustrating the size of the lattice-form circuit.
Figure 6A:
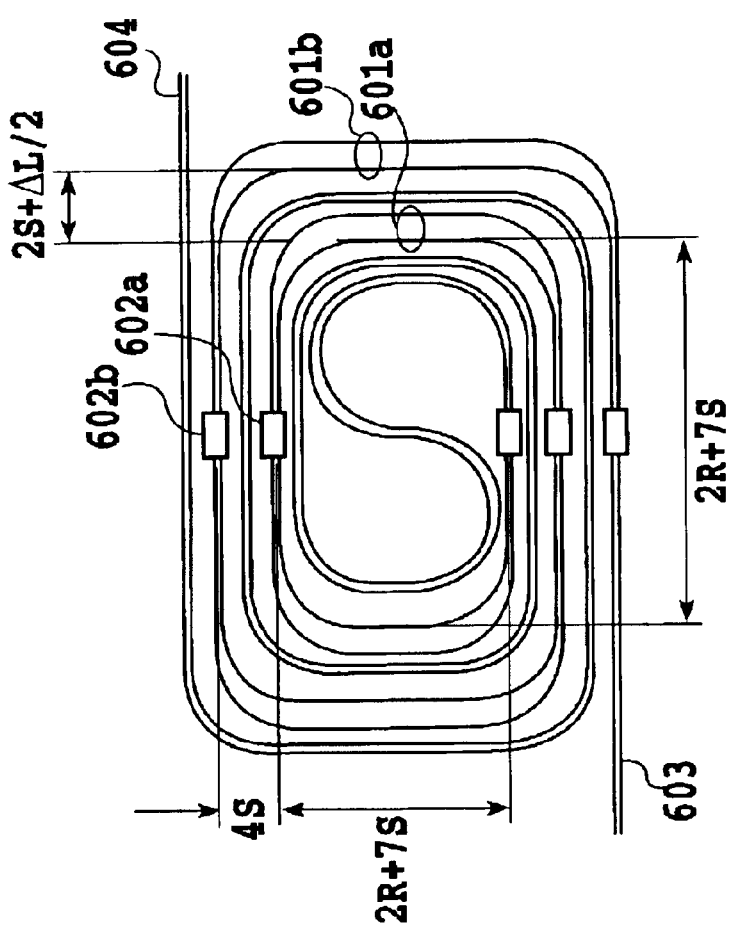
FIG. 6A is a diagram illustrating the size of a lattice-form circuit according to the present invention.

The size of the lattice-form circuit according to the present invention will be described. FIG. 6A shows a circuit layout, and FIG. 6B shows a delay circuit in detail. The lattice-form circuit is composed of an input waveguide 603, adjacent delay circuits 601a and 601b, adjacent optical couplers 602a and 602b, and an output waveguide 604.

As shown in FIG. 6A, the minimum interval between the delay circuits is (2S+ΔL/2). Further, the minimum interval between the optical couplers is 4S. Accordingly, as described in FIG. 3, the arms of the delay circuit and the optical couplers can be integrated together at such an interval that they are not coupled together. Furthermore, the size of the circuit is restricted by the innermost turn-up portion (2R+7S)×(2R+7S). However, as described previously, since the arms of the delay circuit and the optical couplers can be integrated together at such an interval that they are not coupled together, a multistage configuration allows the circuit to be miniaturized compared to the prior art.

Further, as shown in FIG. 6B, the size of the delay circuit can be arbitrarily controlled using the lengths L1 and L2 of the straight portions of the inner arm thereof. Consequently, even if the delay circuits do not have the fixed optical path length difference ΔL, the entire circuit can be laid out so that the inner and outer circuits will not cross each other.

Figure 7:
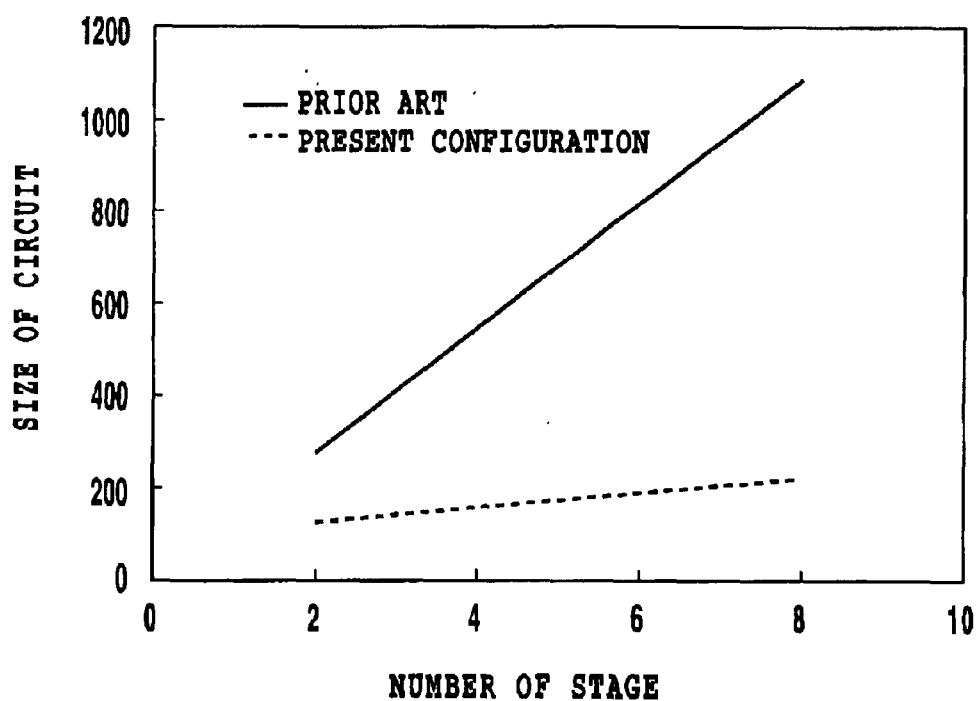
FIG. 7 is a chart showing the relationship between circuit size and the number of stages for the configurations of the present and conventional lattice-form circuits.

FIG. 7 shows the relationship between circuit size and the number of stages for the configurations of the present and conventional lattice-form circuits. The circuit sizes of both lattice-form circuits increase linearly with the number of stages, but the lattice-form circuit according to the present invention has a smaller increase rate. Further, the lattice-form circuit according to the present invention has a half or smaller circuit size, indicating that it is effective on miniaturization.

Figure 8:
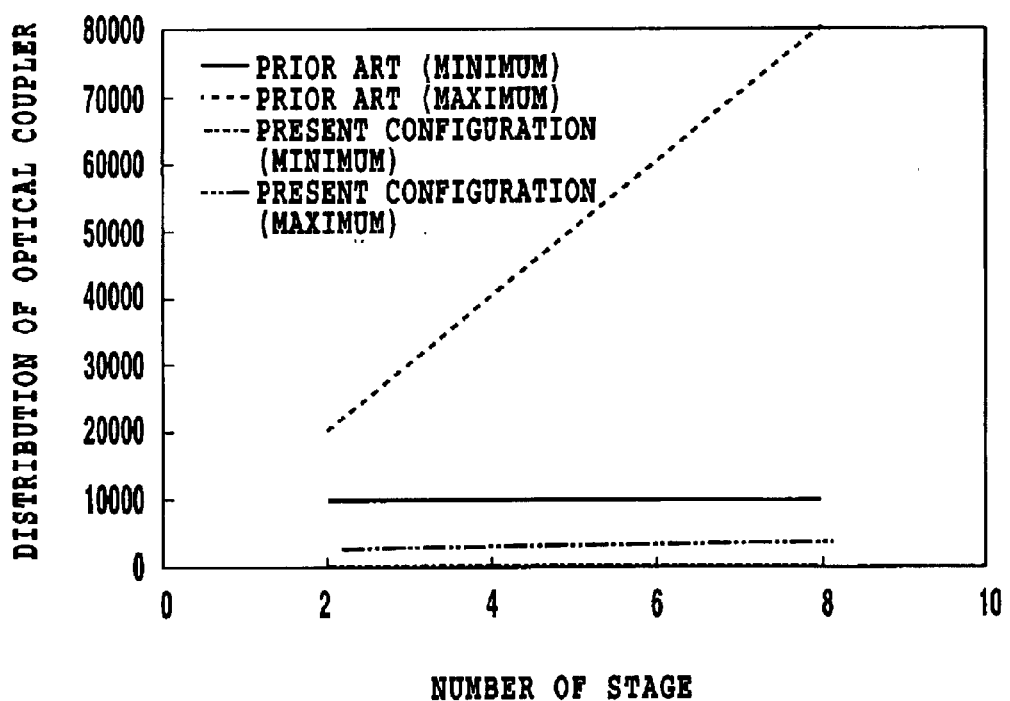
FIG. 8 is a chart showing the distribution of optical couplers for the configurations of the present and conventional lattice-form circuits.

FIG. 8 is a chart showing the distribution of optical couplers for the configurations of the present and conventional lattice-form circuits. The couplers according to the present invention have a smaller distribution than the conventional couplers and are thus expected to resist the adverse effects of in-plane fabrication errors.

Figure 9:
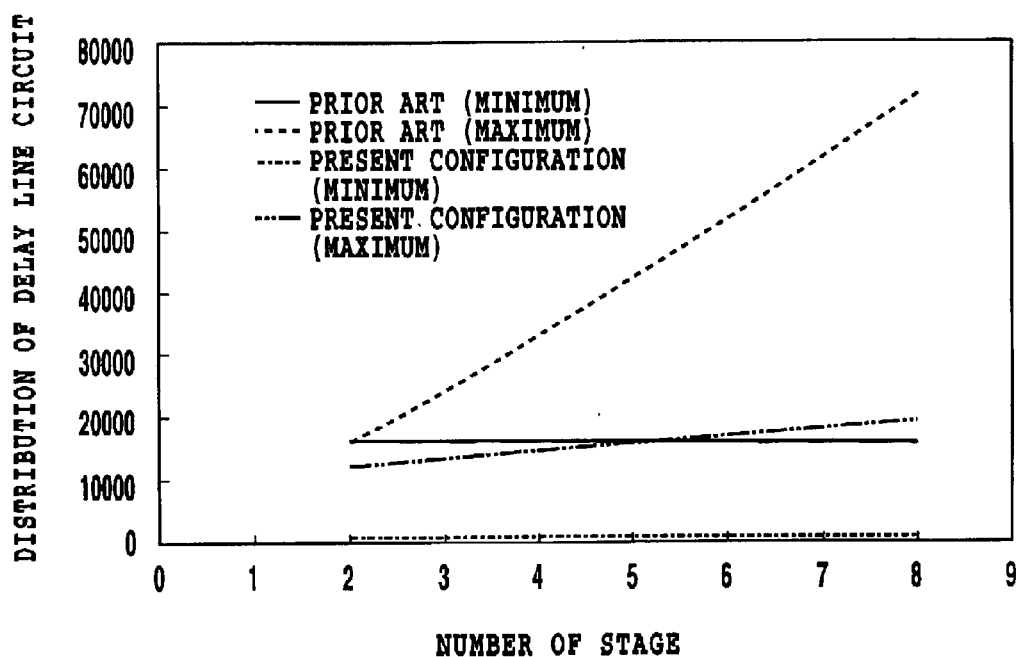
FIG. 9 is a chart showing the distribution of delay circuits for the configurations of the present and conventional lattice-form circuits.

FIG. 9 is a chart showing the distribution of the delay circuits for the configurations of the present and conventional lattice-form circuits. As with the couplers, the delay circuits according to the present invention have a smaller distribution than the conventional delay circuits and are thus expected to resist the adverse effects of in-plane fabrication errors.

The adverse effects of fabrication errors in circuit parameters on the optical characteristics of lattice-form circuits are significant as shown in FIG. 7 of the document "Synthesis of coherent two-part lattice-form optical delay-line circuit", K. Jinguji and M. Kawachi, IEEE Journal of Lightwave Technol., vol. 13, no. 1, pp. 73–82, 1995. Therefore, the lattice-form circuit according to the present invention is expected to resist the adverse effects of fabrication errors to increase the yield of the circuit.

[First Embodiment]

FIGS. 10A to 10E show a method of fabricating a waveguide according to the present invention. First, flame hydrolysis deposition is used to deposit, on a silicon substrate 1001, an under cladding glass soot 1002 mainly composed of $SiO_2$ and a core glass soot 1003 composed of $SiO_2$ and doped with $GeO_2$ (FIG. 10A).

Subsequently, the substrate is vitrified at 1000° C. or higher. At this time, the glass is deposited so that the under cladding glass layer 1004 has a thickness of 30 microns and the core glass 1005 has a thickness of 7 microns (FIG. 10B).

Subsequently, an etching mask is formed on the core glass 1005 using a photolithography technique (FIG. 10C). Then, the core glass 1005 is patterned by reactive ion etching (FIG. 10D).

The etching mask 1006 is removed, and an upper cladding glass 1007 is formed by flame hydrolysis deposition again. The upper cladding glass 1007 is doped with $B_2O_3$ or $P_2O_5$. Glass transition temperature is reduced so that the upper cladding glass 1007 permeates into narrow gaps in the core glass 1005 (FIG. 10E).

Figure 11B:
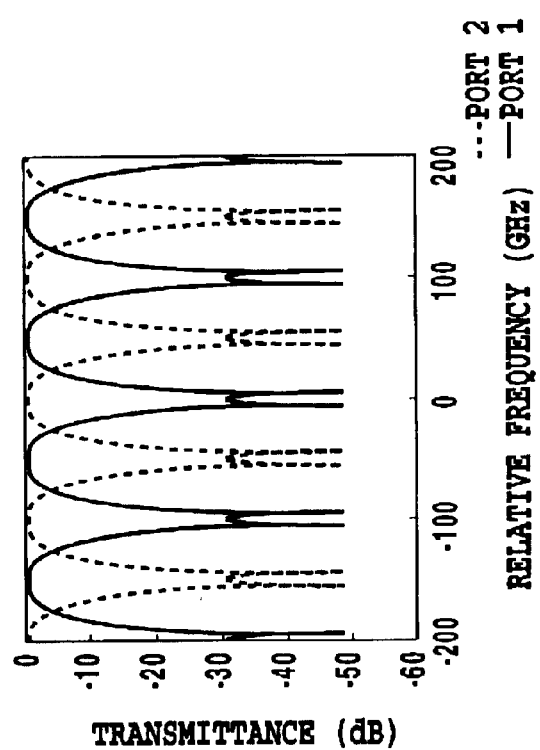
FIG. 11B is a diagram showing the transmission characteristic of the interleave filter constituting the first embodiment.
Figure 11A:
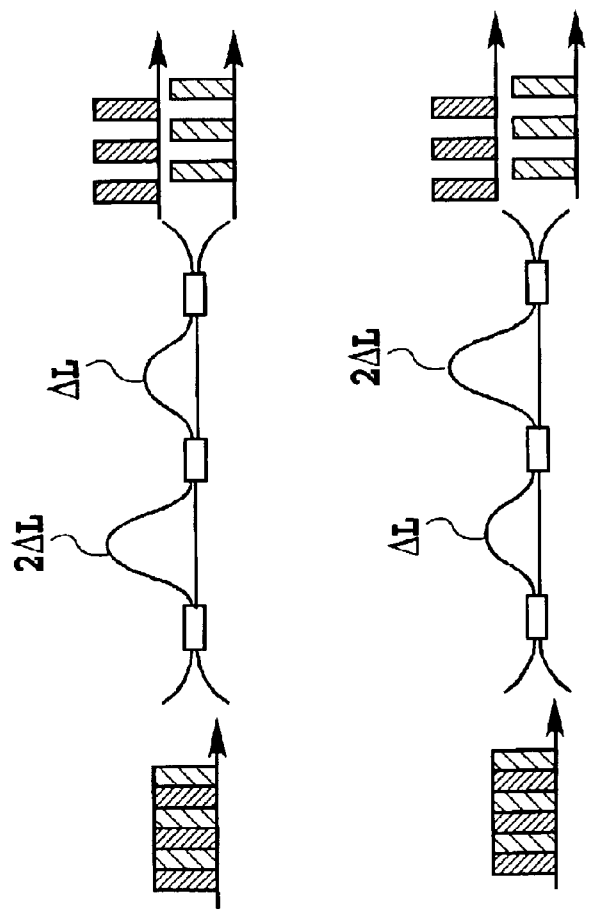
FIG. 11A is a diagram showing the configuration of an interleave filter constituting a first embodiment.

FIG. 11A shows the circuit configuration of an interleave filter constituting a first embodiment. FIG. 11B shows the transmission characteristic of the interleave filter. The interleave filter is composed of two delay circuits ΔL and 2ΔL and has the function of demultiplexing wavelength-multiplexed optical signals into even or odd channels. FIG. 11B shows group demultiplexing, i.e. shows that optical signals from two output ports are alternately demultiplexed at a period of 100 GHz.

Figure 12:
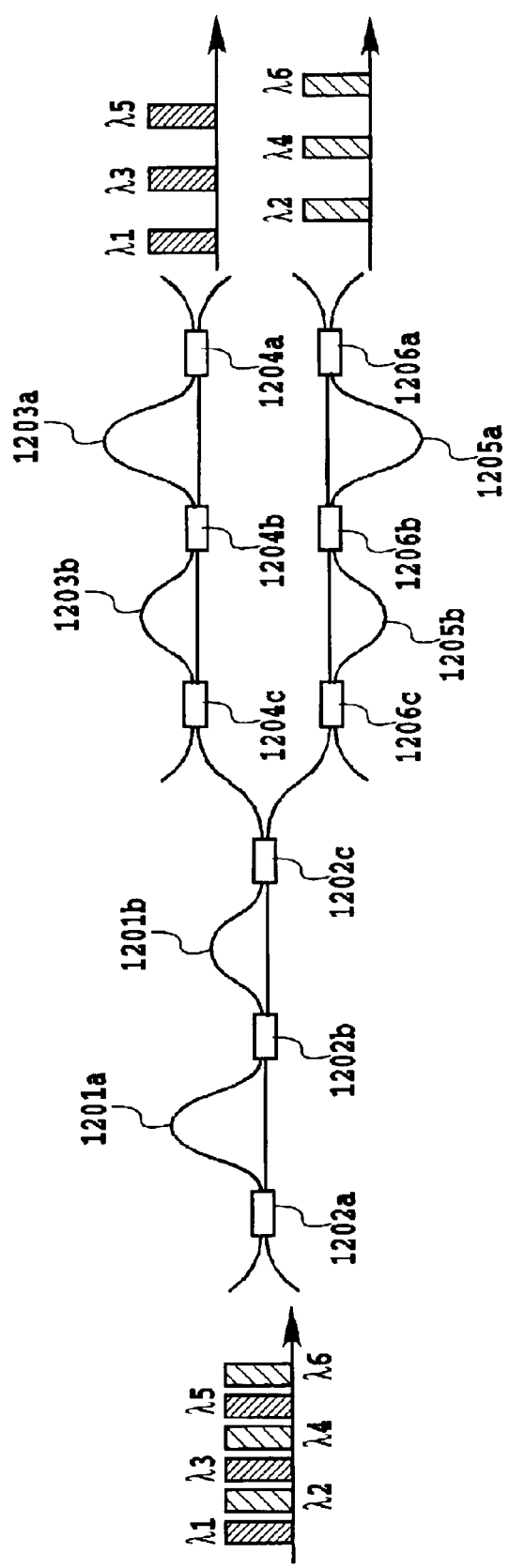
FIG. 12 is a circuit diagram of a lattice-form circuit according to the first embodiment of the present invention.

FIG. 12 shows the circuit configuration of a lattice-form circuit according to the first embodiment of the present invention. To improve an optical crosstalk characteristic, two interleave filters such as the one described previously are provided. The lattice-form circuit is composed of delay circuits 1201a and 1201b of a 1st stage interleave filter, optical couplers 1202a, 1202b, and 1202c of the 1st stage interleave filter, delay circuits 1203a and 1203b and optical couplers 1204a, 1204b, and 1204c of a 2nd stage interleave filter through which odd channel signals are transmitted, and delay circuits 1205a and 1205b and optical couplers 1206a, 1206b, and 1206c of the 2nd stage interleave filter through which even channel signals are transmitted.

One of the spirals is composed of a first lattice-form circuit (optical couplers 1202a to 1202c and delay circuits 1201a and 1201b). The other spiral is composed of a second lattice-form circuit (optical couplers 1204c to 1204a and delay circuits 1203b and 1203a) and a third lattice-form circuit (optical couplers 1206c to 1206a and delay circuits 1205b and 1205a). An output waveguide of the first lattice-form circuit is connected to input waveguides of the second and third lattice-form circuits.

Figure 13:
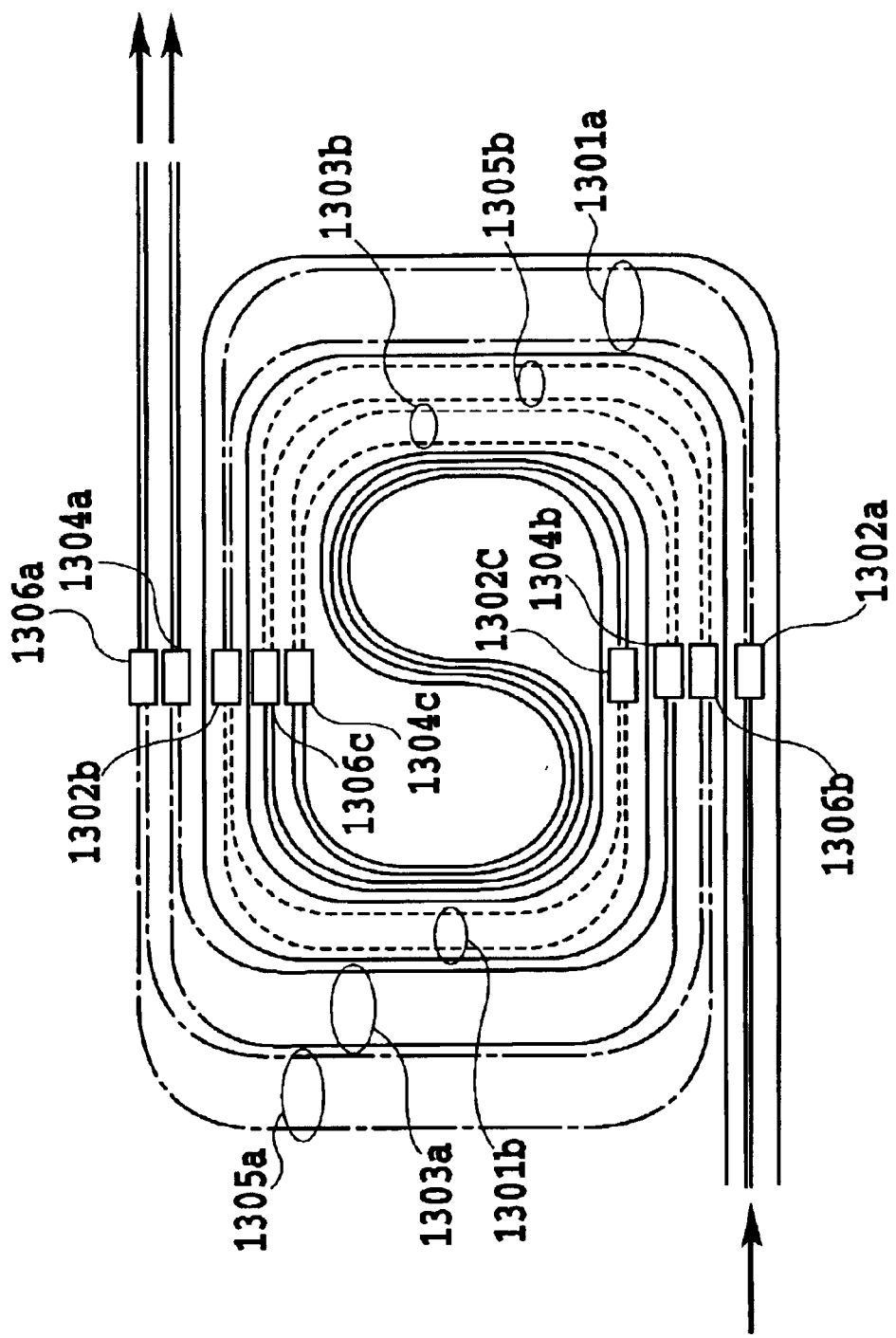
FIG. 13 is a layout diagram of a lattice-form circuit according to the first embodiment of the present invention.

FIG. 13 shows the circuit layout of a lattice-form circuit according to the first embodiment of the present invention. The lattice-form circuit is composed of delay circuits 1301a and 1301b and optical couplers 1302a, 1302b, and 1302c of a 1st stage interleave filter, delay circuits 1303a and 1303b and optical couplers 1304a, 1304b, and 1304c of a 2nd stage interleave filter through which odd channel signals are transmitted, and delay circuits 1305a and 1305b and optical couplers 1306a, 1306b, and 1306c of the 2nd stage interleave filter through which even channel signals are transmitted.

Figure 14:
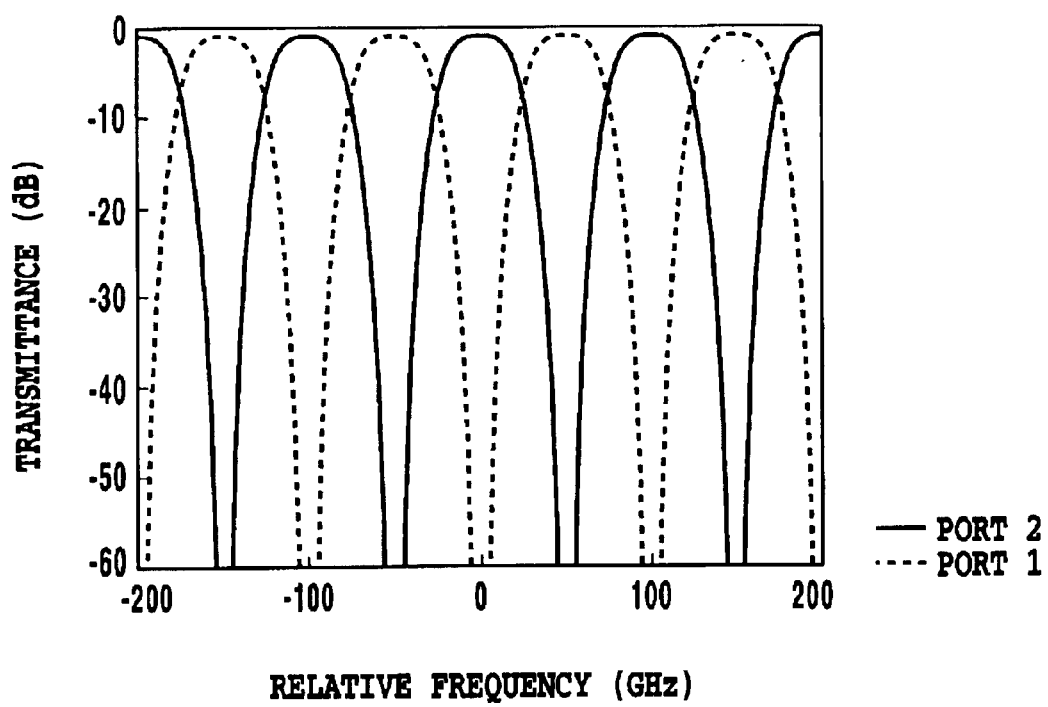
FIG. 14 is a chart showing the transmission characteristic of a circuit according to the first embodiment.

FIG. 14 shows the transmission characteristic of a circuit according to the first embodiment. This interleave filter exhibited good optical characteristics including a crosstalk of −30 dB or lower and an insertion loss of 2 dB or lower at a period of 100 GHz.

[Second Embodiment]

Figure 15:
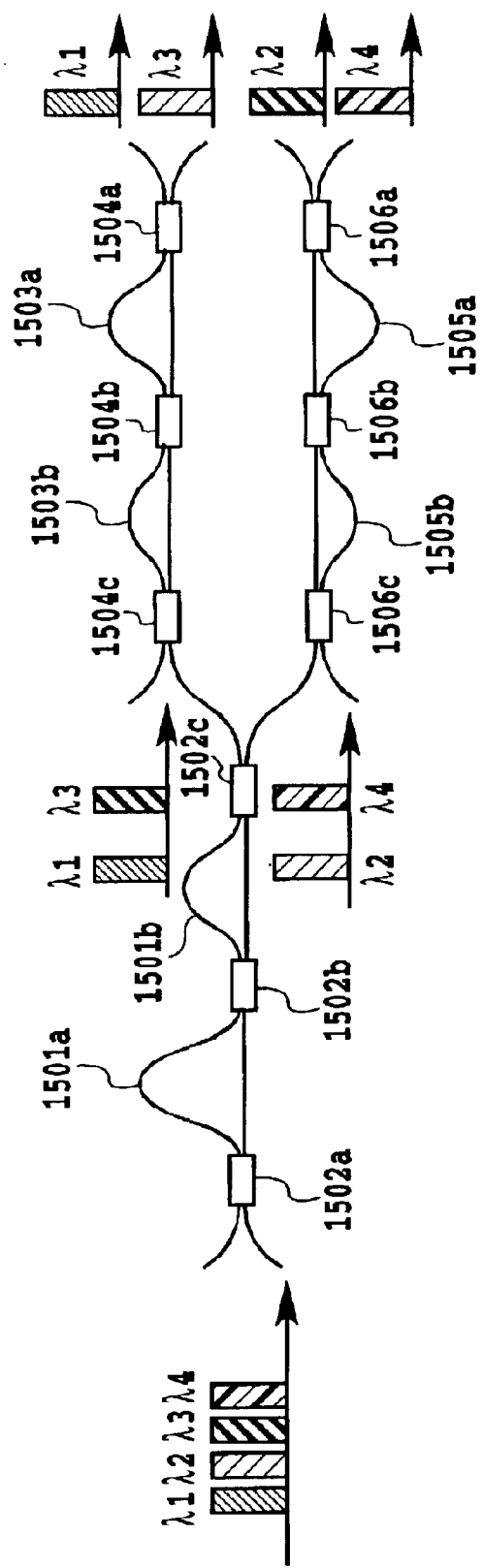
FIG. 15 is a circuit diagram of a lattice-form circuit according to a second embodiment of the present invention.

FIG. 15 shows the configuration of a lattice-form circuit according to a second embodiment of the present invention. In the circuit according to the second embodiment, the group demultiplexing channel interval of the 2nd stage interleave filter according to the first embodiment is set to be double that of the 1st stage interleave filter to provide a 4 channel demultiplexing circuit. The entire circuit is designed so that the 2nd stage delay circuits have optical path length differences ΔL/2 and ΔL, which are half of those of the 1st stage delay circuits, ΔL and 2ΔL.

The lattice-form circuit is composed of delay circuits 1501a and 1501b and optical couplers 1502a, 1502b, and 1502c of a 1st stage interleave filter, delay circuits 1503a and 1503b and optical couplers 1504a, 1504b, and 1504c of a 2nd stage interleave filter through which odd channels are transmitted, and delay circuits 1505a and 1505b and optical couplers 1506a, 1506b, and 1506c of the 2nd stage interleave filter through which even channels are transmitted.

Figure 16:
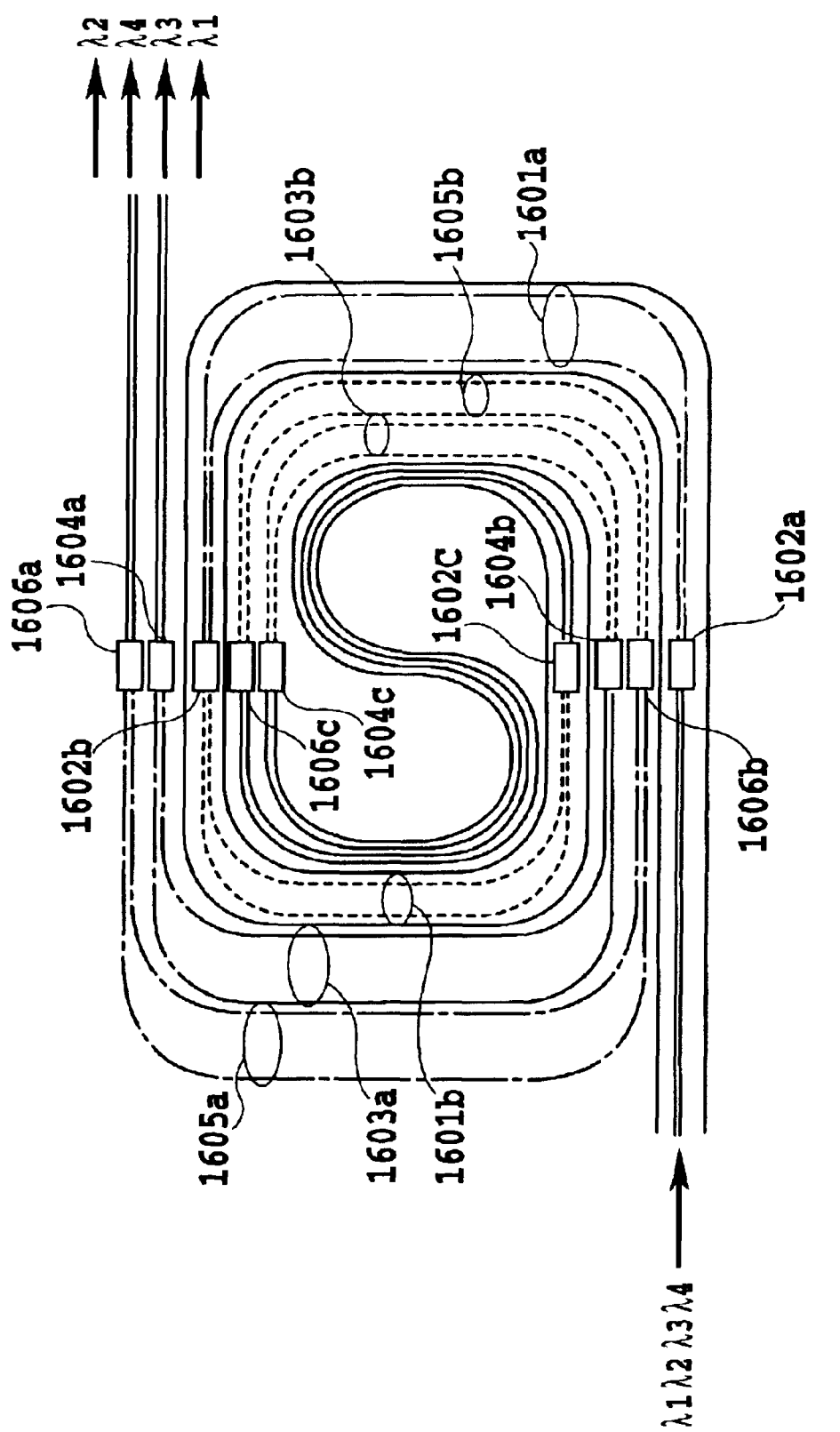
FIG. 16 is a layout diagram of a lattice-form circuit according to the second embodiment of the present invention.

FIG. 16 shows the layout of a lattice-form circuit according to the second embodiment of the present invention. This figure shows how delay circuits are optical couplers are integrated together. The lattice-form circuit is composed of delay circuits 1601a and 1601b and optical couplers 1602a, 1602b, and 1602c of a 1st stage interleave filter, delay circuits 1603a and 1603b and optical couplers 1604a, 1604b, and 1604c of a 2nd stage interleave filter through which odd channel signals are transmitted, and delay circuits 1605a and 1605b and optical couplers 1606a, 1606b, and 1606c of the 2nd stage interleave filter through which even channel signals are transmitted.

Figure 17A:
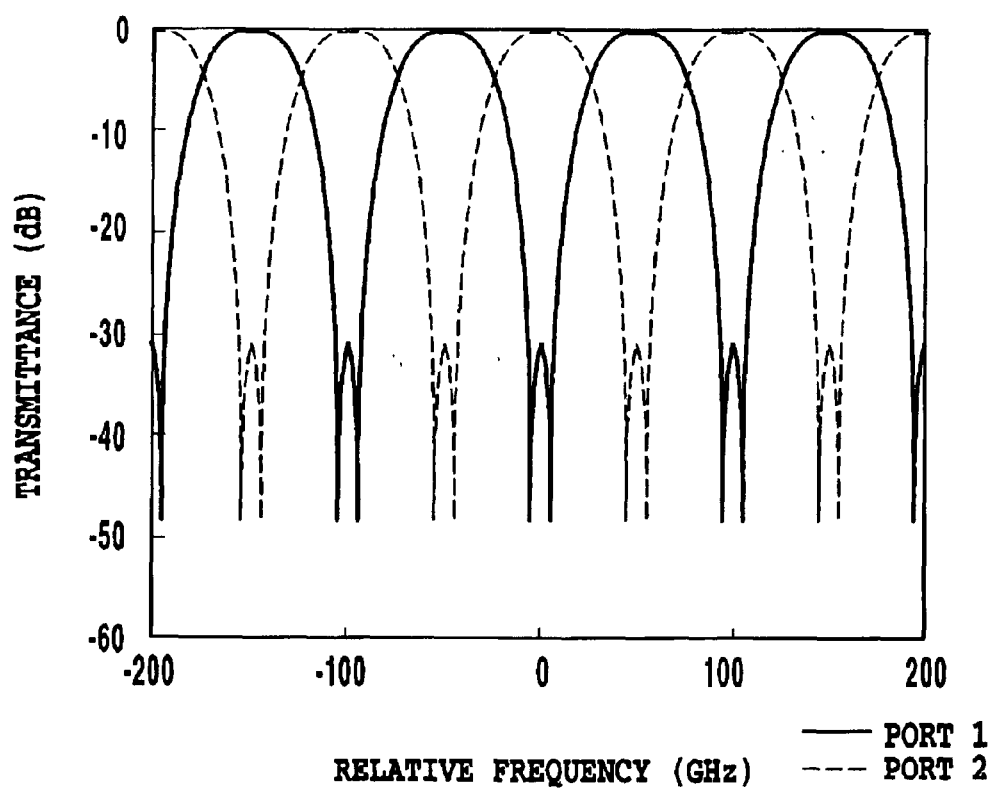
FIG. 17A is a chart showing the transmission characteristic of a 1st stage interleave filter according to the second embodiment.
Figure 17B:
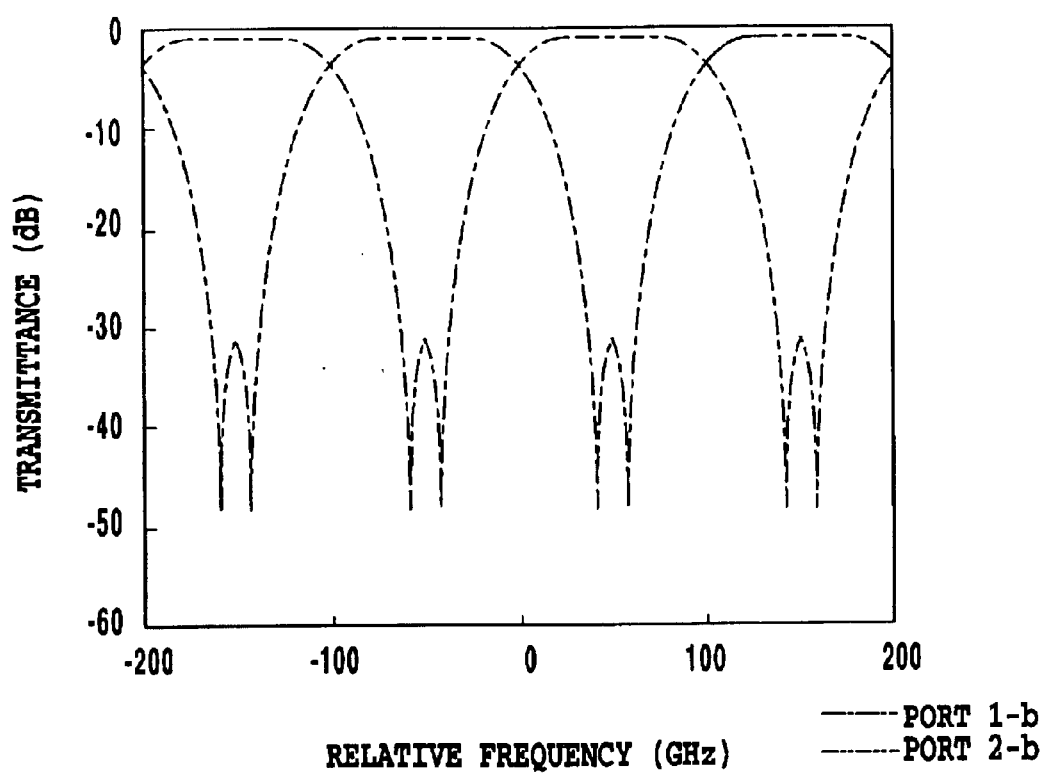
FIGS. 17B and 17C are charts showing the transmission characteristic of a 2nd stage interleave filter according to the second embodiment.
Figure 17C:
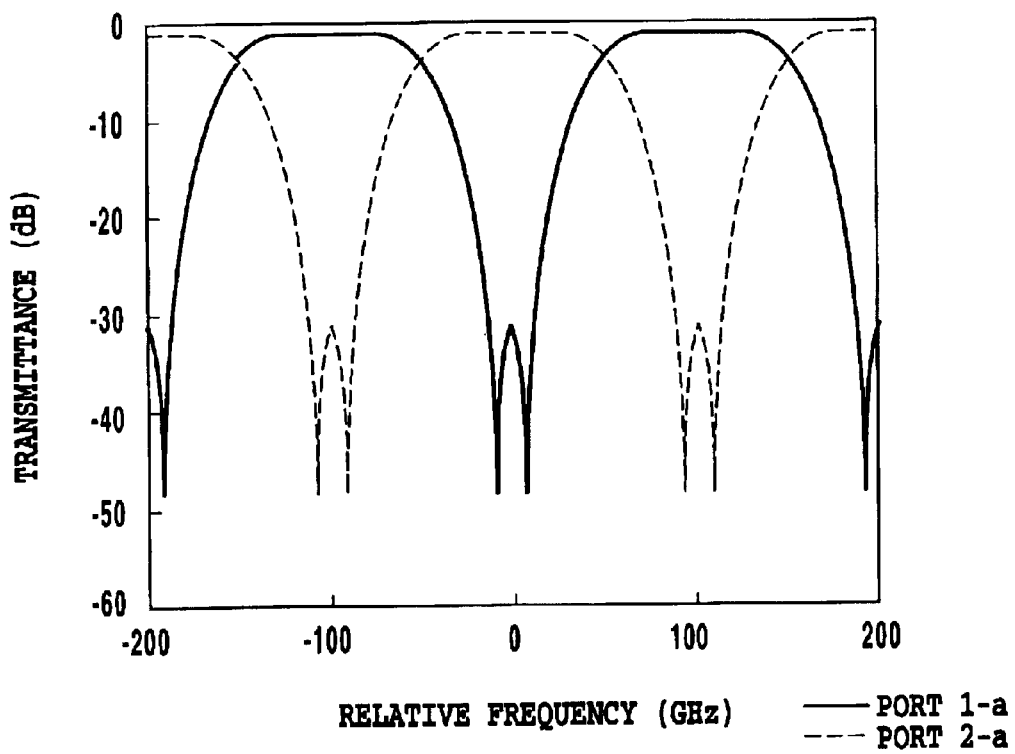
Figure 17D:
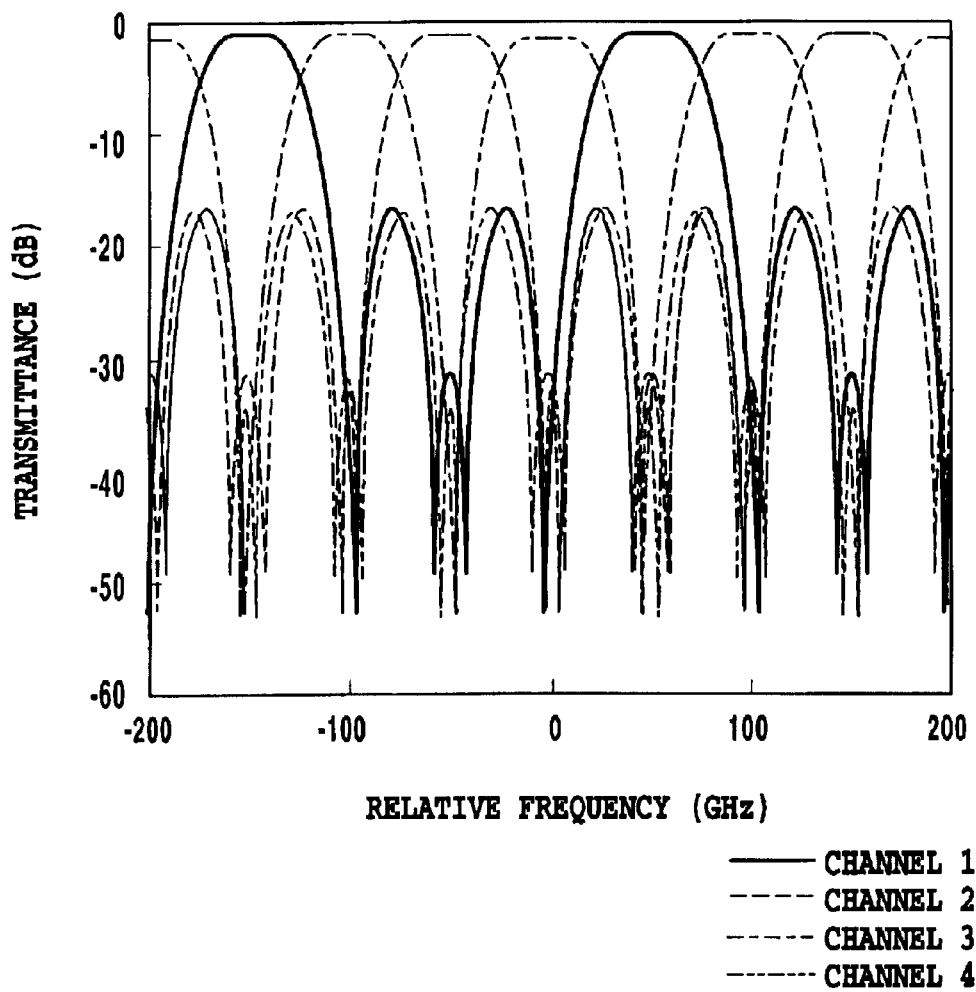
FIG. 17D is a diagram showing the transmission characteristic of the entire filter according to the second embodiment.

The transmission characteristic of the lattice-form circuit according to the second embodiment will be shown. FIG. 17A shows the transmission characteristic of the 1st stage interleave filter according to the second embodiment. FIGS. 17B and 17C show the transmission characteristic of the 2nd stage interleave filter. FIG. 17D shows the transmission characteristic of the entire filter. This filter exhibited good spectral characteristics including a crosstalk of −30 dB or lower and an insertion loss of 2 dB or lower at a period of 100 GHz.

The above described embodiments show lattice-form circuits in which a number of optical couplers and delay circuits are cascaded together on a silicon substrate using quartz-based glass waveguides. The above described principle of the present invention is applicable even if the waveguides are made of polyimide, silicone, semiconductors, $LiNbO_3$, or the like. Further, the substrate is not limited to silicon.

It goes without saying that the essence of the present invention is to pay attention to the circuit arrangement and spirally arrange the circuit to provide a productive lattice-form circuit.

[Optical Coupler]

Now, the optical couplers used in the lattice-form circuit will be described. The present invention uses four directional couplers. A possible loss to the directional couplers is very small irrespective of fabrication errors or polarization. Accordingly, the entire excess loss can be sufficiently reduced. Further, the optical path length differences between the three areas between four directional couplers are on the order of optical wavelength. Accordingly, even if the optical waveguides are expanded to provide optical path length differences, the interval between the optical waveguides is small. This sufficiently reduces the adverse effects of fabrication errors such as a fluctuation in waveguide film on the optical path length differences.

An optical circuit using directional couplers is generally characterized in that the branching ratios of the directional couplers vary depending on fabrication errors or polarization. With the configuration of optical couplers according to the present invention, the branching ratio of the entire optical circuit can be set close to the desired value irrespective of the mutual deviation of the directional optical couplers. The reason will be described below.

In an optical circuit having four directional couplers in the center thereof, the optical path length difference between the first and second directional couplers is defined as $\Delta L1$, the optical path length difference between the second and third directional couplers is defined as $\Delta L2$, and the optical path length difference between the third and fourth directional couplers is defined as $\Delta L3$. Then, if it is assumed that $\Delta L1 = -\Delta L3 = \Delta Lc$, then the branching ratio $\eta$ of the optical divider/combiner is as shown below at a wavelength $\lambda$.

$$\eta = 4c(1-c)\cos^2(\pi \Delta L2/\lambda)$$

The branching ratio $\eta$ refers to the rate of the power of light emitted from one of the optical waveguides as a result of what is called crossing of lights incident on the other optical waveguide. In this case, if the branching ratio of one directional coupler is defined as $\kappa$, $c$ is given as follows:

$$c = 4\kappa(1-\kappa)\cos^2(\pi \Delta Lc/\lambda)$$

In the optical divider/combiner described in Japanese Patent Application Laid-Open No. 11-344629 (1999), $\Delta Lc = \Delta L2 = \lambda/4$. However, in this case, only $\Delta Lc = \lambda/4$ is substituted into the above equation.

$$\eta = (8\kappa - 24\kappa^2 + 32\kappa^3 - 16\kappa^4)\cos^2(\pi \Delta L2/\lambda)$$

That is, if the branching ratio of the directional coupler is 0.5 as designed, $\eta$ is expressed as follows:

$$\eta = \cos^2(\pi \Delta L2/\lambda)$$

The branching ratio can be set at an arbitrary value between 0 and 1 by changing the designed value of $\Delta L2$ on the assumption that $\Delta L1 = -\Delta L3 = \lambda/4$. That is, $\Delta L2$, which provides the target coupling ratio x of the entire circuit, is given by:

$$\Delta L2 = \pm \lambda \cdot \cos^{-1}(\sqrt{x})/\pi \pm m\lambda \quad (m = 0, 1, \ldots)$$

Here, the branching ratio $\eta$ obtained if $\kappa$ varies around 0.5 because of fabrication errors will be examined. When the branching ratio $\kappa$ of each directional coupler is 0.5, the first-, second-, and third-order differential are given by:

$$\partial \eta / \partial \kappa = \{8 - 48\kappa + 96\kappa^2 - 64\kappa^3\}\cos^2(\pi \Delta L2/\pi) = 0$$

$$\partial \eta / \partial \kappa = \{-48 + 192\kappa + 102\kappa^2\}\cos^2(\pi \Delta L2/\pi) = 0$$

$$\partial \eta / \partial \kappa = \{192 - 384\kappa\}\cos^2(\pi \Delta L2/\pi) = 0$$

As is apparent from these equations, the first- to third-order differentials of $\eta$ is 0 when $\kappa = 0.5$. Accordingly, $\eta$ can have a very stable value even if $\kappa$ varies. For example, when the target coupling ratio x of the entire circuit is 0.25, the branching ratio $\eta$ of the optical coupler according to the present invention is 0.244 even if the branching ratio $\kappa$ of the directional coupler is 0.30 owing to fabrication errors.

That is, even if the branching ratio of each of the directional couplers included in the optical divider/combiner fluctuates, the desired branching ratio of the entire optical coupler can be very stably achieved according to the configuration of optical couplers according to the present invention. Optical couplers can be provided which have a small excess loss and are very stable irrespective of fabrication errors or a polarization state, for not only a branching ratio of 50% but also arbitrary branching ratios.

Now, the use of segment waveguides in a delay line part will be described. If both first and second optical waveguides have a uniform effective index, then to provide an optical path length difference between the two optical waveguides arranged between the directional couplers, at least one of the optical waveguides must be composed of a bending waveguide to physically provide a waveguide length difference. Since a possible loss to the entire circuit and the polarization dependence must be minimized, it is impossible to provide a large radius of curvature or a waveguide integrated with a reflector. Accordingly, a moderately bending waveguide must be used which has a bending radius of a certain given value or larger.

In both first and second waveguides, light is emitted from and impinges on the directional coupler in the same propagating directions. A large optical path length cannot be provided very close to the directional coupler whether a straight or bending waveguide is used. Thus, even if a very small optical path length difference is provided, the overall length of the delay line part is large. For example, an optical waveguide having an effective index of 1.45 and a permissible bending radius of 10 mm is used to provide an optical path length difference of 387.5 nm (a quarter of an operating wavelength of 1.55 $\mu$m), the delay line part has a physical length of more than 1300 $\mu$m. Further, the optical circuit has three delay line parts, the total length of the delay line parts alone is between 2.6 and 5.3 mm.

If both or part of the first and second optical waveguides is composed of a segment waveguide, the effective index can be varied depending on the state of the segments. Consequently, a bending waveguide is not always required to provide an optical path length difference between the two optical waveguides arranged between the directional couplers.

The segment structure must be selected in view of excess loss and polarization dependence. For example, it is known that if the optical waveguide has an effective index of 1.45 and a relative refractive index difference of 0.75%, excess loss and polarization dependence are small when the segment structure is such that 5 $\mu$m waveguide gaps are formed at the intervals of 25 $\mu$m in the longitudinal direction (for example, T. Saida et al., "Silica-based 2×2 multimode interference coupler with arbitrary power splitting ratio", Electron Lett., 1999 (35), pp. 2031–2033). With this segment waveguide, the overall length of the delay line part required to provide an optical path length difference of 387.5 nm is 180 μm or smaller, and the total length of the three delay line parts in the optical circuit is 0.36 to 1.8 mm.

The use of the segment waveguide in the delay line parts enables the total length to be reduced compared to delay line parts composed of only optical waveguides having a uniform effective index. This effectively reduces the chip size of a dispersion equalizer including a large number of optical couplers according to the present invention, thereby increasing yield, while reducing costs.

Figure 18:
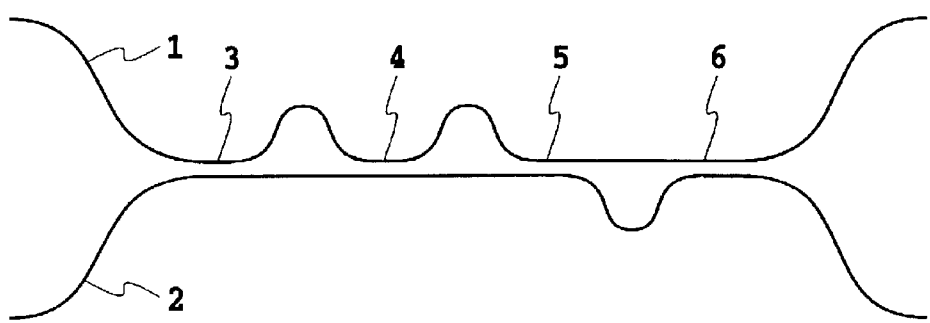
FIG. 18 is a diagram showing optical couplers according to an embodiment of the present invention.

FIG. 18 is a diagram showing the configuration of optical couplers according to an embodiment of the present invention. Optical waveguides 1 and 2 approach each other at four locations to form directional couplers. The optical waveguides 1 and 2 between the four directional couplers 3 to 6 are configured to have optical path length differences as described later. The optical waveguides produced had a fixed width and height of 8×8 μm. The optical waveguides produced had an effective index n of 1.45067 at wavelength of 1.55 μm. Further, the bending waveguides had a fixed bending radius of 10 mm. To intentionally allow the directional couplers to deviate from each other, the coupling lengths of the directional couplers 3 to 6 were set at values between 0 and 2000 μm at a pitch of 100 μm.

The optical waveguide 1 between the directional couplers 3 and 4 was configured to be actually 0.267 μm longer than the optical waveguide 2 therebetween so that the former was longer than the latter by an optical path length difference of λ/4 at wavelength of 1.55 μm. The optical waveguide 2 was composed of a straight waveguide having a length of 1368.6 μm. The optical waveguide 1 was formed of four bending waveguides having a bending radius of 10 mm and a center angle of 1.96°.

The optical waveguide 1 between the directional couplers 5 and 6 was configured to be actually 0.267 μm shorter than the optical waveguide 2 therebetween so that the former was shorter than the latter by an optical path length difference of λ/4 at wavelength of 1.55 μm. The optical waveguide 2 was formed of four bending waveguides having a bending radius of 10 mm and a center angle of 1.96°. The optical waveguide 1 was composed of a straight waveguide having a length of 1368.6 μm.

To indicate the designed degree of freedom of the branching ratio of the entire optical divider/combiner, the designed values of the branching ratio x of the entire optical divider/combiner were set between 10 to 90% at 10% increments. With the branching ratio x, the optical waveguide 1 between the directional couplers 4 and 5 is actually longer than the optical waveguide 2 therebetween by an optical path length difference determined by the following equation at wavelength of 1.55 μm:

$$\delta = \lambda \cos^{-1}(\sqrt{x})/n\pi = \Delta L2/n\pi$$

When the set branching ratio x is 10, 20, 30, 40, 50, 60, 70, 80, and 90%, the waveguide length difference δ is 0.425, 0.377, 0.337, 0.301, 0.267, 0.233, 0.197, 0.158, and 0.109 μm, respectively. If the set branching ratio is, for example, 10%, the optical waveguide 1 is composed of four bending waveguides having a bending radius of 10 mm and a center angle of 2.29°. The optical waveguide 2 is composed of a straight waveguide having a length of 1597.3 μm.

Figure 19:
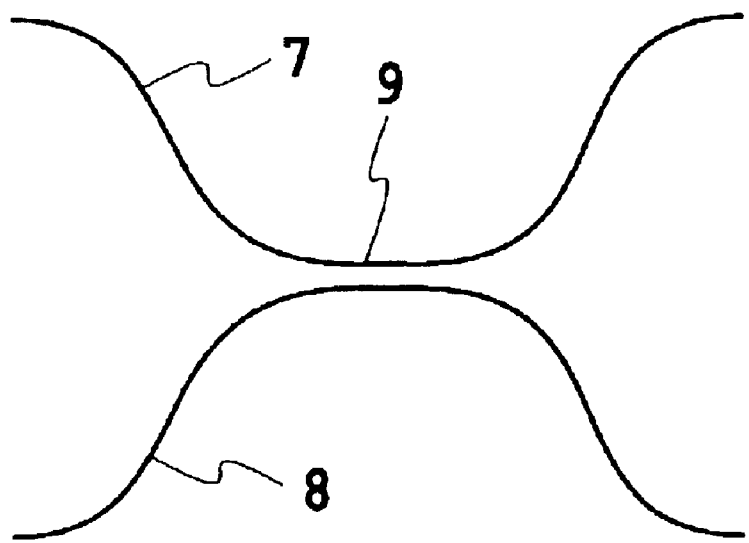
FIG. 19 is a diagram showing a first example of a test circuit for the optical couplers.

FIG. 19 shows a first example of a test circuit for the optical coupler. Optical waveguides 7 and 8 were used to form only a directional coupler 9. The designed values of the branching ratio were set between 10 to 90% at 10% increments. More specifically, for the set branching ratios 10, 20, 30, 40, 50, 60, 70, 80, and 90%, the coupling length was set at 434, 701, 919, 1117, 1306, 1495, 1693, 1911, and 2178 μm.

Figure 20:
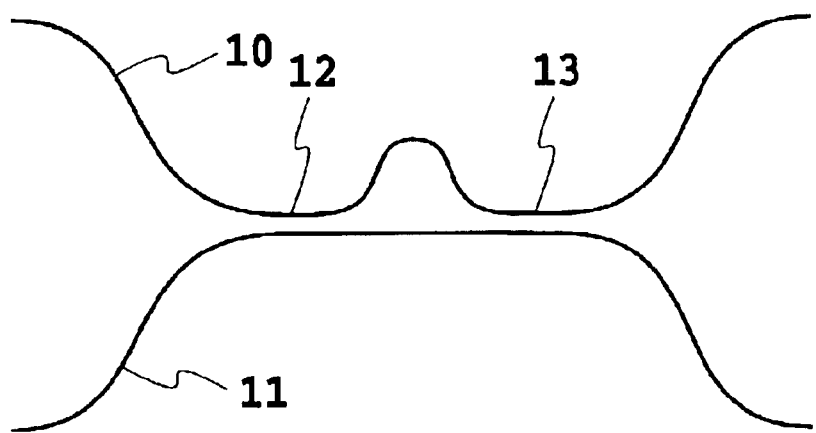
FIG. 20 is a diagram showing a second example of a test circuit for the optical couplers.

FIG. 20 shows a second example of a test circuit for the optical coupler. Directional couplers 12 and 13 were cascaded together relative to waveguides to constitute a Mach-Zehnder interferometer. The waveguide length difference was similarly set at 0.425, 0.377, 0.337, 0.301, 0.267, 0.233, 0.197, 0.158, and 0.109 μm.

A photo mask was produced in which were laid out the optical couplers shown in FIG. 18 and the test circuits for optical couplers shown in FIGS. 19 and 20. This photo mask was used to produce six wafers. First, on a silicon substrate silica-based under cladding layer and core layer doped with $GeO_2$ are formed by flame hydrolysis deposition. Then, the above described photo mask was used to transfer a waveguide pattern to the core layer. A core pattern was then formed by reactive ion etching. Subsequently, an upper cladding layer was formed by flame hydrolysis deposition to produce a buried waveguide. The relative refractive index difference between the cladding layer and the core layer was 0.75%.

The branching ratios of the optical couplers produced were evaluated using laser beams from an external cavity type wavelength-variable laser having an adjusted wavelength of 1.5 μm. For the evaluation, 1.55-μm polarization maintained fibers were used for an input side, whereas 1.55-μm DSFs (Dispersion Shifted Fibers) were used for an output side. The transmitted optical power of the optical divider/combiner was evaluated by abutting the fibers against the optical circuit via matching oil.

A method of evaluating the branching ratio of the optical divider/combiner will be described with reference to FIG. 18. When a laser light is incident on the optical waveguide 1, the quantity of light subsequently emitted from the optical waveguides 1 and 2 is measured. Thereafter, when a laser light is incident on the optical waveguide 2, the quantity of light subsequently emitted from the optical waveguides 1 and 2 is measured. The measured values are then substituted into the following equation to determine the branching ratio:

$$\eta = 1/2\{P12/(P11+P12)+P21/(P21+P22)\}$$

where P11 is the quantity of light emitted from the optical waveguide 1 when a laser light is incident on the optical waveguide 1, P12 is the quantity of light emitted from the optical waveguide 2 when a laser light is incident on the optical waveguide 1, P21 is the quantity of light emitted from the optical waveguide 1 when a laser light is incident on the optical waveguide 2, P22 is the quantity of light emitted from the optical waveguide 2 when a laser beam is incident on the optical waveguide 2.

Further, the excess loss of the optical divider/combiner was evaluated on the basis of the difference between the sum of the quantities of light emitted from the optical waveguides 1 and 2 and the level of light received when the input and output fibers are directly abutted against the optical circuit.

Figure 21:
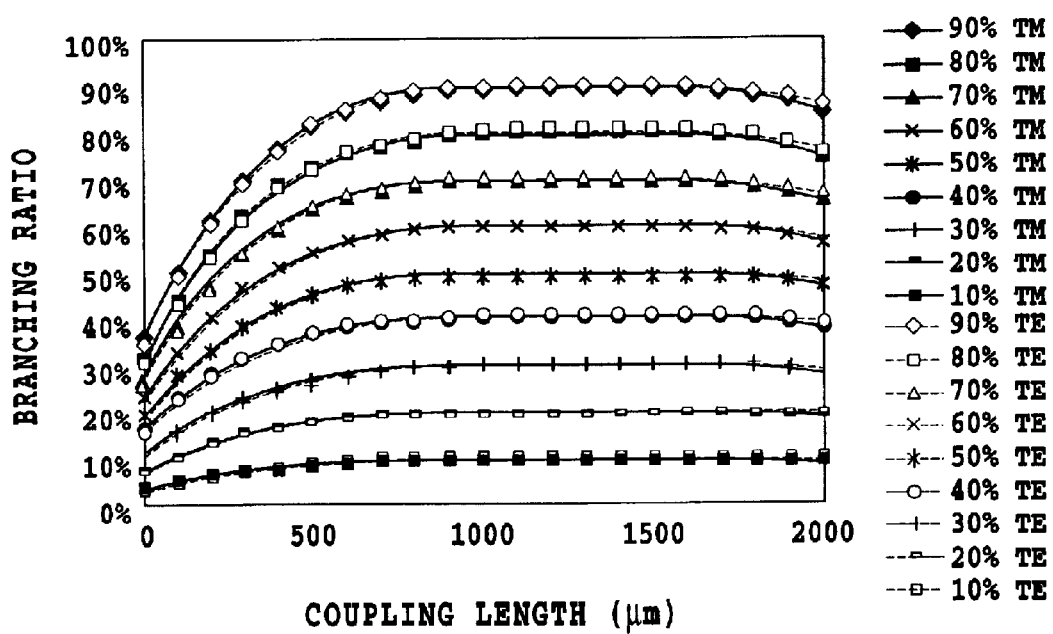
FIG. 21 is a chart showing the branching ratios of the optical couplers according to this embodiment of the present invention for TM and TE mode.

FIG. 21 shows the branching ratio of the optical couplers shown in FIG. 18 for TM and TE mode. With the configuration of optical waveguides according to this embodiment of the present invention, the designed target value of the branching ratio 50±1% was achieved within a wide range of coupling length between 900 and 1700 μm.

Figure 22:
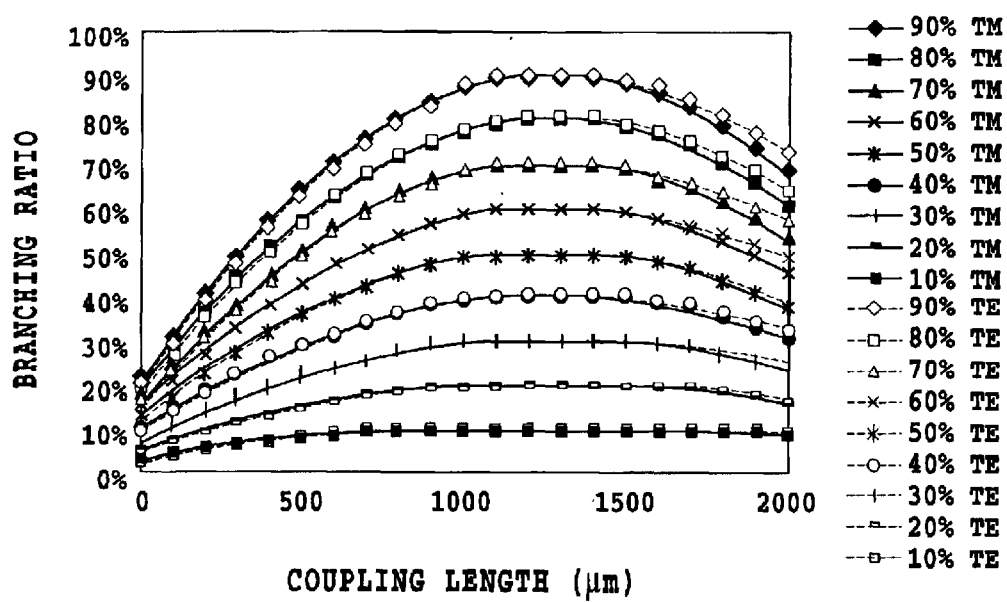
FIG. 22 is a chart showing the branching ratio for the TM and TE mode for the first example of the test circuit.

FIG. 22 shows the branching ratio of the optical couplers shown in FIG. 19 for TM and TE mode. With the configuration of Mach-Zehnder interferometer type optical couplers, the designed target value of the branching ratio 50±1% was achieved within a wide range of coupling length between 1200 and 1400 µm.

Figure 23:
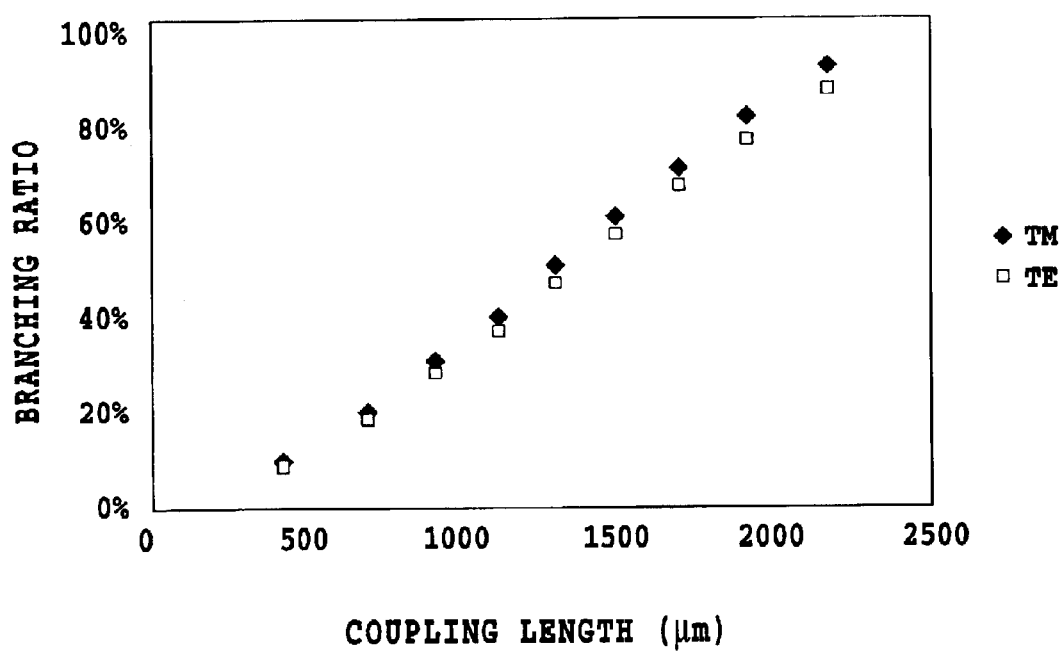
FIG. 23 is a chart showing the branching ratio for the TM and TE mode for the second example of the test circuit.

FIG. 23 shows the branching ratio of the optical couplers shown in FIG. 20 for TM and TE mode. With the configuration of only directional couplers, the designed target value of the branching ratio 50±1% was achieved within a wide range of coupling length between 1298 and 1340 µm.

Thus, for the configuration of only directional couplers as well as Mach-Zehnder interferometer type optical couplers, a coupling length tolerance that serves to obtain the desired branching ratio ±1% was 420 and 200 µm, respectively. For the configuration of optical couplers according to this embodiment of the present invention, the tolerance was increased up to 800 µm. The optical couplers according to this embodiment of the present invention is significantly effective in correcting the deviation of the directional couplers, which is likely to lead to fabrication errors, to obtain the desired branching ratio with a high yield.

Figure 24:
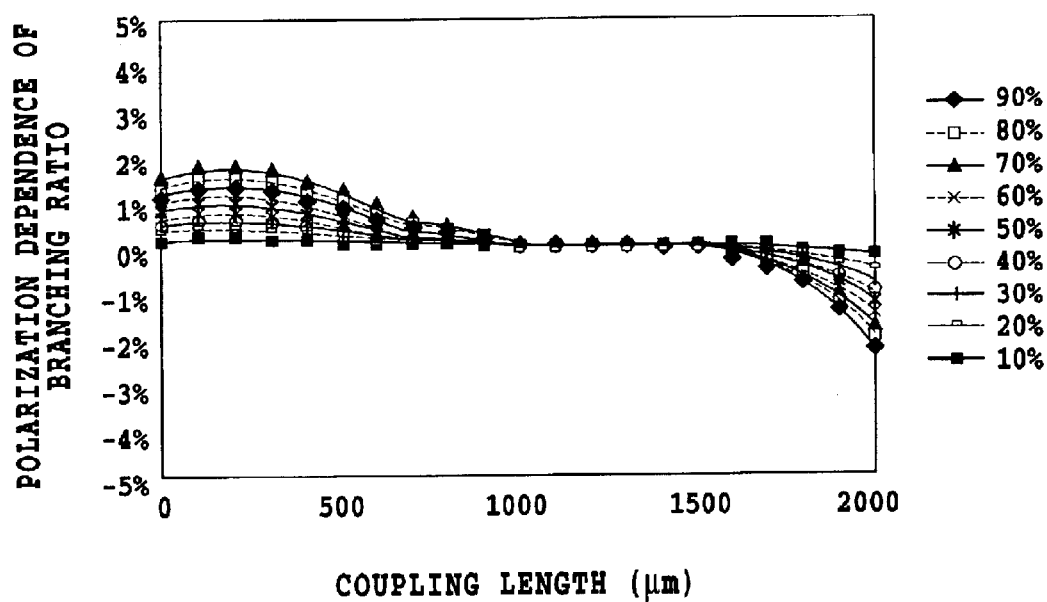
FIG. 24 is a diagram showing the polarization dependence of the optical couplers according to this embodiment of the present invention.

FIG. 24 shows the polarization dependence of the optical couplers according to the above embodiment of the present invention. For the configuration of optical waveguides, the polarization dependence of the branching ratio was ±0.5% within a wide range of coupling length between 800 and 1700 µm.

Figure 25:
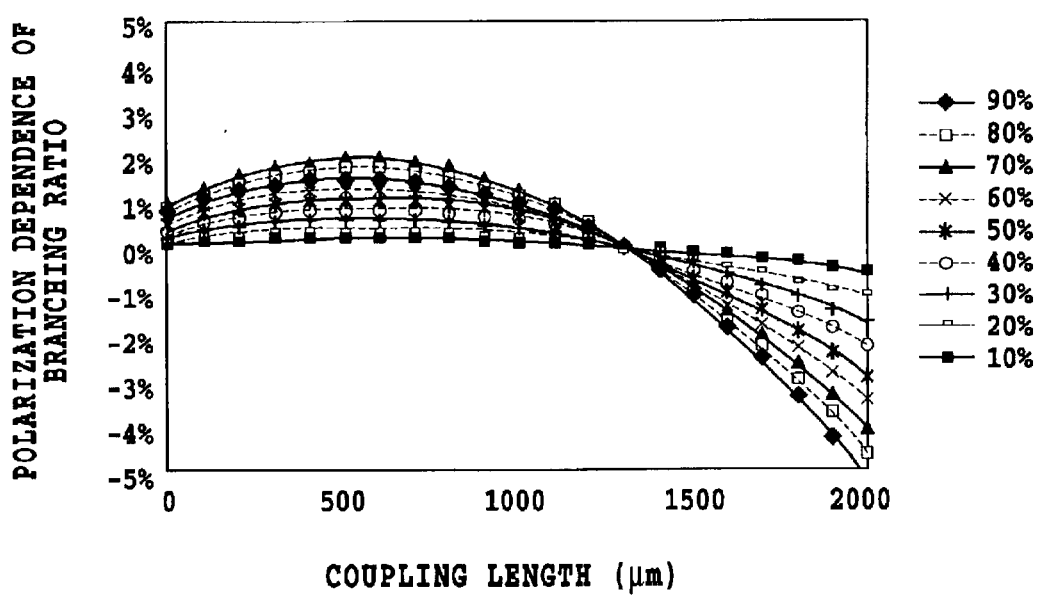
FIG. 25 is a diagram showing the polarization dependence of the first example of the test circuit.

FIG. 25 shows the polarization dependence of the first example of the test circuit. With the Mach-Zehnder interferometer-based test circuit, the dependence is limited to within the range of 1200 to 1400 µm.

Figure 26:
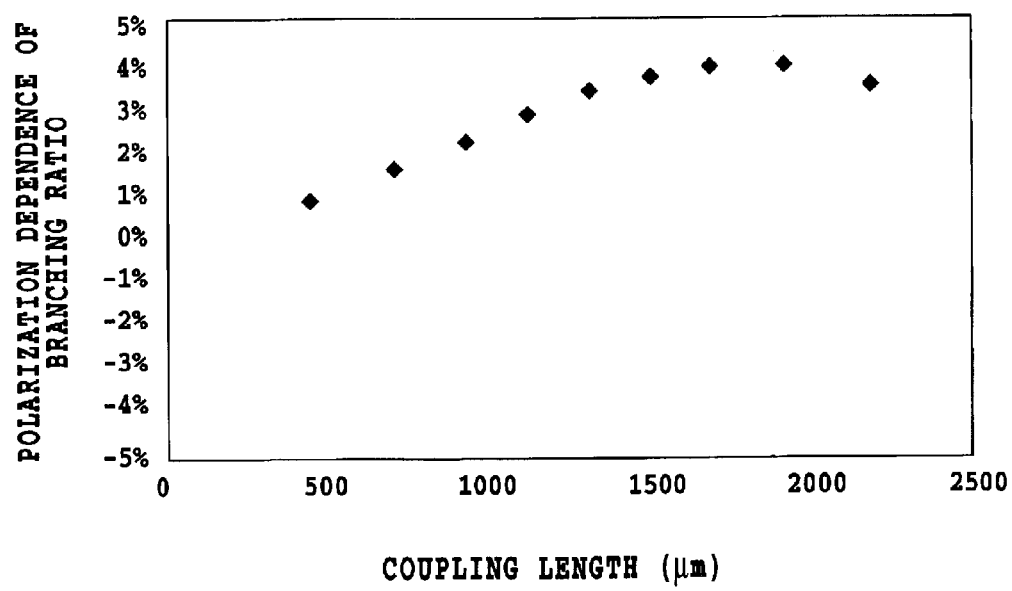
FIG. 26 is a diagram showing the polarization dependence of the second example of the test circuit.

FIG. 26 shows the polarization dependence of the second example of the test circuit. For the configuration of only directional couplers, the polarization dependence is very significant; it is 0.8% when the target branching ratio value is 10%, and is 3.8% when the target branching ratio value is 70%.

Thus, the configuration of optical waveguides according to this embodiment of the present invention has a large coupling length tolerance that serves to provide optical couplers having low polarization dependence. This configuration is thus effective in obtaining optical couplers having a stable branching ratio relative to a polarization state.

The same photo mask was used to produce six wafers on different days. The wafers were evaluated to determine how the branching ratios of optical couplers deviate from the designed target value. It was determined how the branching ratio and the polarization dependence varied among the six wafers.

Figure 27:
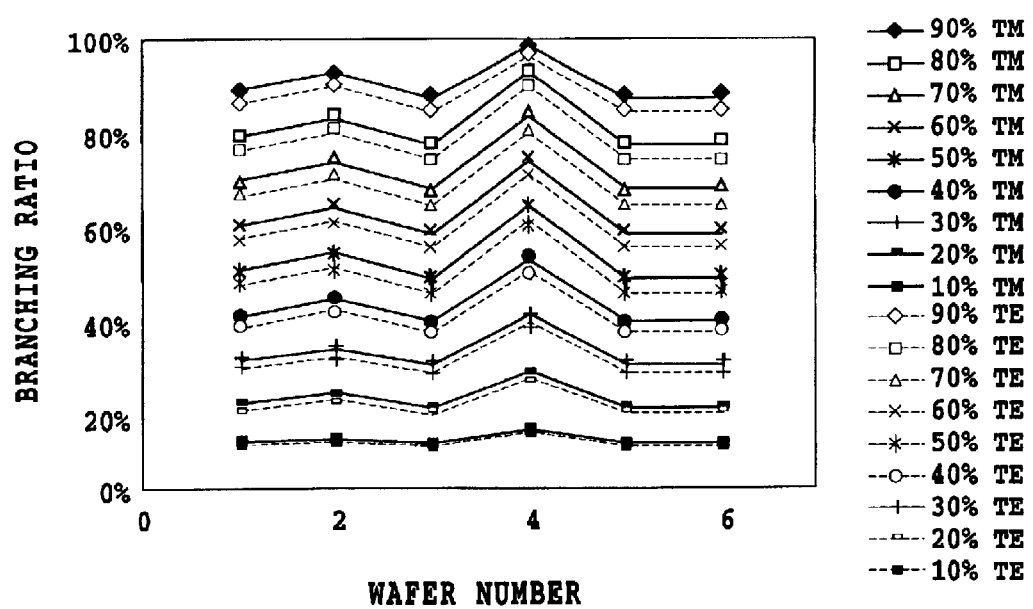
FIG. 27 is a chart showing the branching ratios of six wafers for the second example of the test circuit.

FIG. 27 shows the branching ratios of six wafers for the second example of the test circuit. A circuit was constructed using only directional couplers, with the target value varying between 10 and 90%. The branching ratios of the directional couplers are not stable in such a manner that the branching ratio varies according to the wafer. The largest upward deviation from the target branching ratio is 13%.

Figure 28:
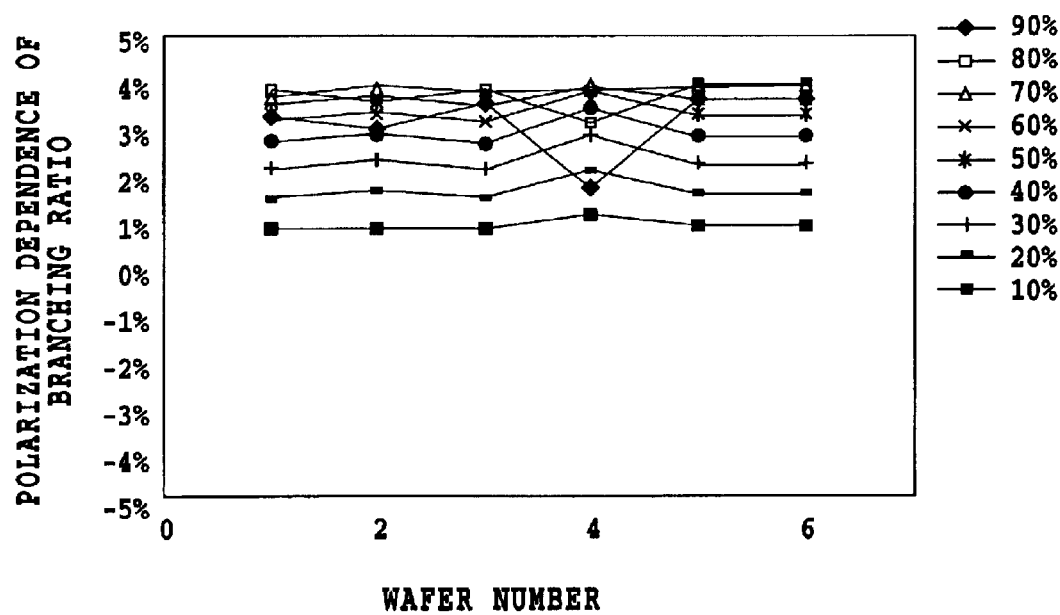
FIG. 28 is a chart showing the polarization dependence of six wafers for the second example of the test circuit.

FIG. 28 shows the polarization dependence of six wafers for the second example of the test circuit. The polarization dependence of the branching ratio is marked and is between nearly 1% and nearly 4%. In particular, for all optical couplers with a target branching ratio of 30 to 80%, the polarization dependence is equal to or more than 2%.

Figure 29:
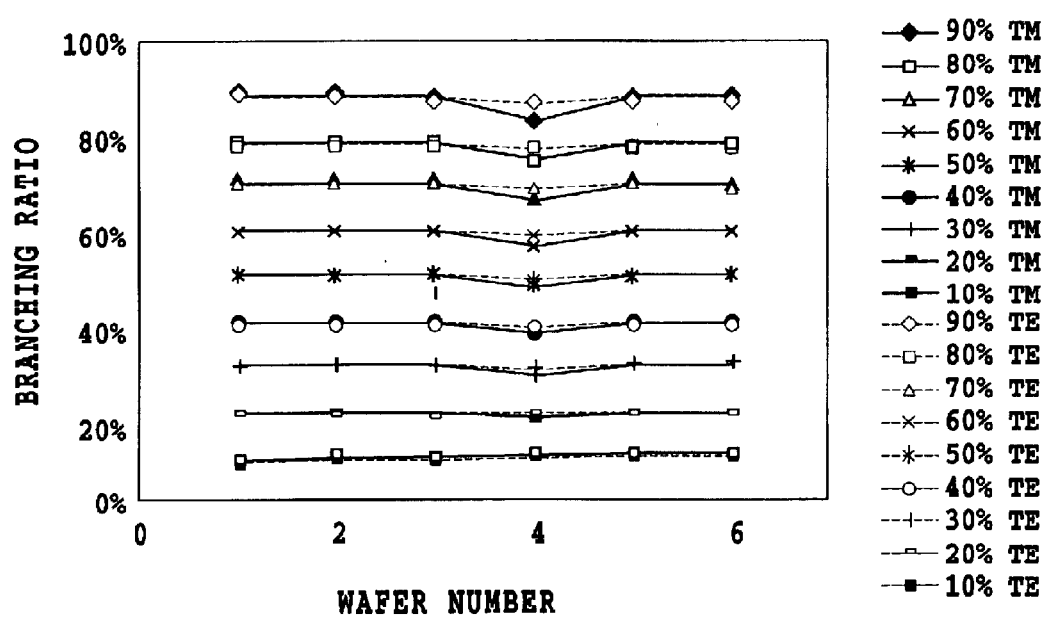
FIG. 29 is a chart showing the branching ratios of six wafers for the first example of the test circuit.

FIG. 29 is a chart showing the branching ratios of six wafers for the first example of the test circuit. This figure shows the branching ratios of those optical couplers included in the Mach-Zehnder interferometer-based configuration which employ directional couplers with a coupling length of 1300 µm. All optical couplers other than those with wafer number 4 fall within the range of the target value ±1.5%. Some of the optical couplers with wafer number 4 deviate from the target value by 5%. Thus, there is a small variation among the wafers.

Figure 30:
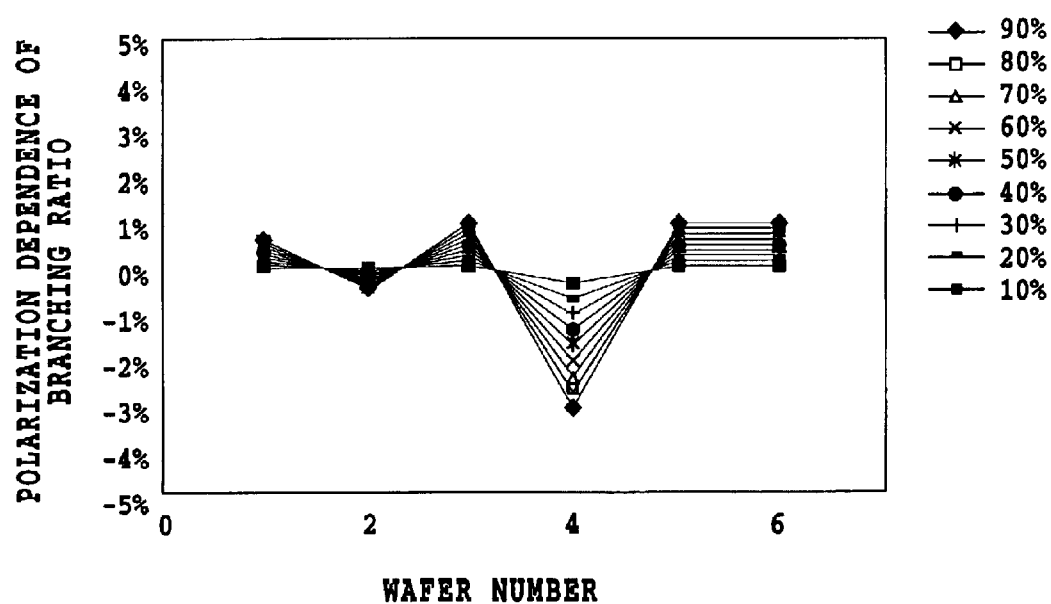
FIG. 30 is a chart showing the polarization dependence of six wafers for the first example of the test circuit.

FIG. 30 is a chart showing the polarization dependence of the six wafers for the first example of the test circuit. The worst value for the polarization dependence of the branching ratio is large, −3%, indicating that there is a variation in polarization dependence among the wafers.

Figure 31:
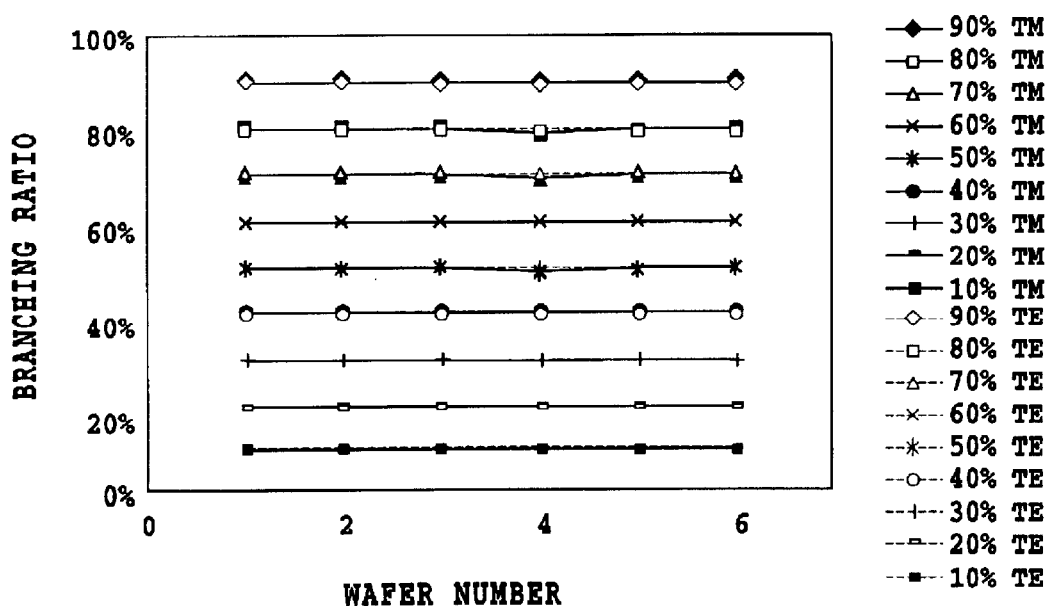
FIG. 31 is a chart showing the branching ratios of six wafers for the optical couplers according to this embodiment of the present invention.

FIG. 31 shows the branching ratios of six wafers for the optical couplers according to this embodiment of the present invention. This figure shows the branching ratios of those optical couplers employing directional couplers having a coupling length of 1300 µm. There are substantially no variations in optical coupler branching ratio among the wafers, indicating that the target branching ratio has been achieved with a high yield. Even the largest deviation from the target branching ratio is less than 0.5%.

Figure 32:
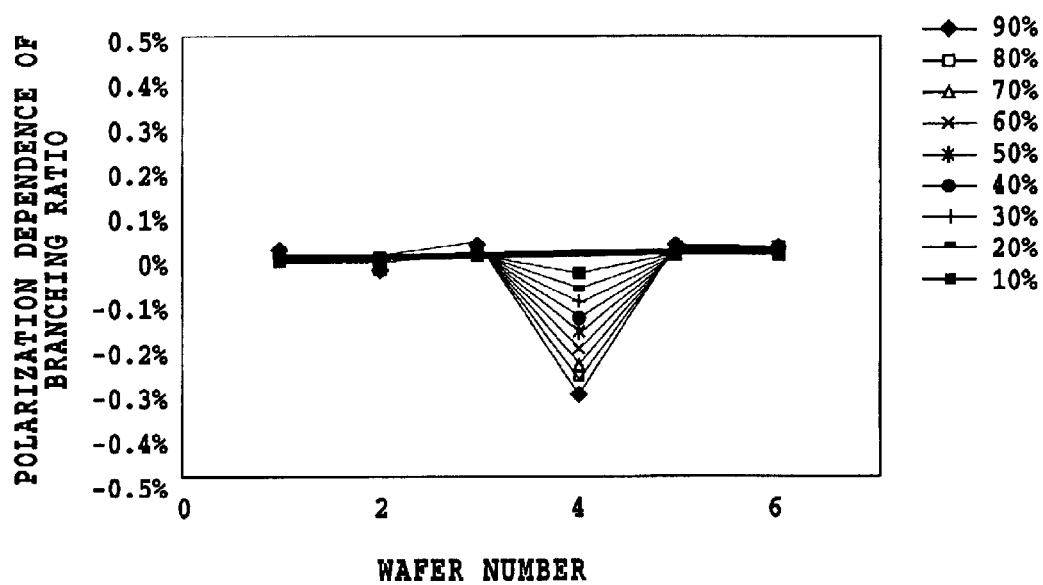
FIG. 32 is a chart showing the polarization dependence of six wafers for the optical couplers according to this embodiment of the present invention.

FIG. 32 shows the polarization dependence of six wafers for the optical couplers according to this embodiment of the present invention. This figures shows that the polarization dependence of the branching ratio has been improved by about one order. The optical coupler with wafer number 4 exhibits a slight polarization dependence. However, in view of measurement errors or the like, optical couplers with a polarization dependence of nearly zero have been produced with a high yield.

Figure 33:
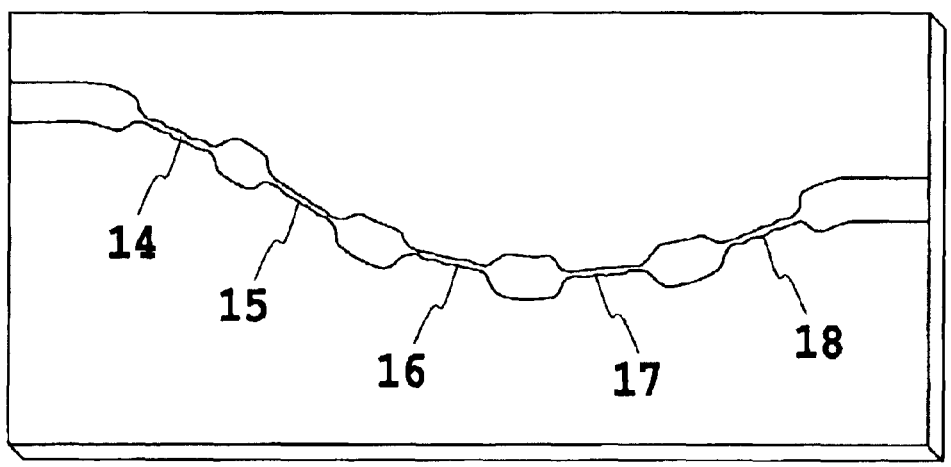
FIG. 33 is a diagram showing the configuration of an interleave filter composed of optical couplers according to this embodiment of the present invention.

FIG. 33 shows the configuration of a CWDM (Coarse Wavelength Division Multiplexing) interleave filter composed of optical couplers according to this embodiment of the present invention. The interleave filter had five optical couplers 14 to 18 and four delay line parts each arranged between the optical couplers. The four optical path length differences were sequentially set at 60.8, −121.7, −122.4, and −122.4 µm. Actually, the waveguide used had an effective index of 1.45, so that the waveguide length differences were set at 41.9, −83.9, −84.4, and −84.4 µm. The branching ratios of the optical couplers 14 to 18 were set at 50, 14.3, 31.3, 6.7, and 0.6%.

Figure 34:
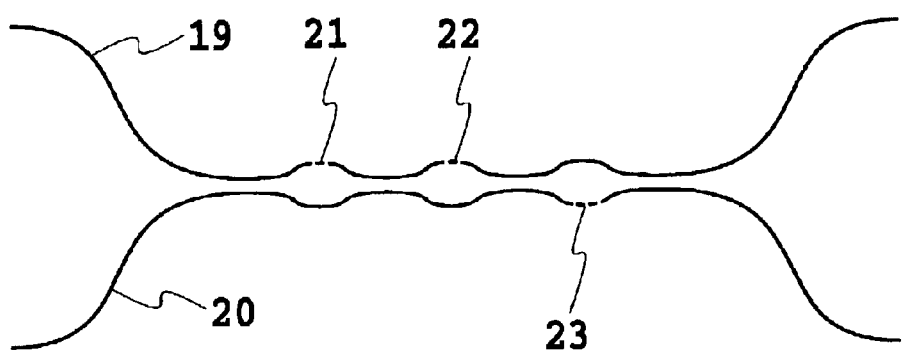
FIG. 34 is a diagram showing the configuration of optical couplers using segment waveguides according to this embodiment of the present invention.

FIG. 34 shows the configuration of optical couplers using segment waveguides according to this embodiment of the present invention. Optical waveguides 19 and 20 were formed to approach each other at four locations to form directional couplers. Three delay line parts were formed so that each of them was located between the directional couplers. The delay line parts were composed of segment waveguides 21 to 23, respectively. The segmentation of the waveguides will be described. The segment waveguide was constructed so as to have gaps of about 5 µm width formed at the intervals of 25 µm in the direction in which propagating light travels. When these intervals were likely to result in an extra distance in connection with the desired optical path length differences, gaps having a width of less than 5 µm were formed at the respective ends of the segment waveguide portion for adjustment. The chip size of the entire interleave filter was 55.5 mm in length and 12.5 mm in width. The chip had an area of about 700 mm$^2$, and six chips could be arranged on a 4-inch wafer.

For comparison, an interleave filter having a configuration similar to that of the above described interleave filter was produced using optical couplers produced using waveguides having a uniform effective index instead of segment waveguides. The branching ratios of five optical couplers and the four optical path length differences had the same values as those of the above described filter. The optical path length differences of a wavelength order provided inside the optical couplers were provided using a combination of straight and bending waveguides. The chip size of the entire interleave filter was 70.5 mm in length and 16.5 mm in width. The chip had an area of about 1200 mm², and three chips could be arranged on a 4-inch wafer.

Figure 35:
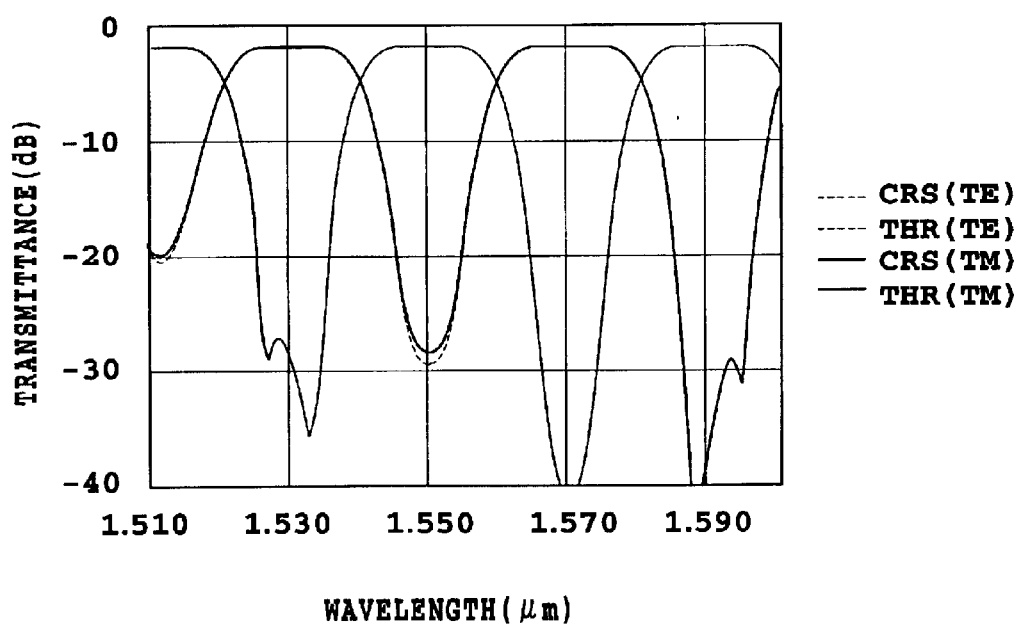
FIG. 35 is a chart showing the transmission spectra of an interleave filter composed of the optical couplers using the segment waveguides according to this embodiment of the present invention.
Figure 36:
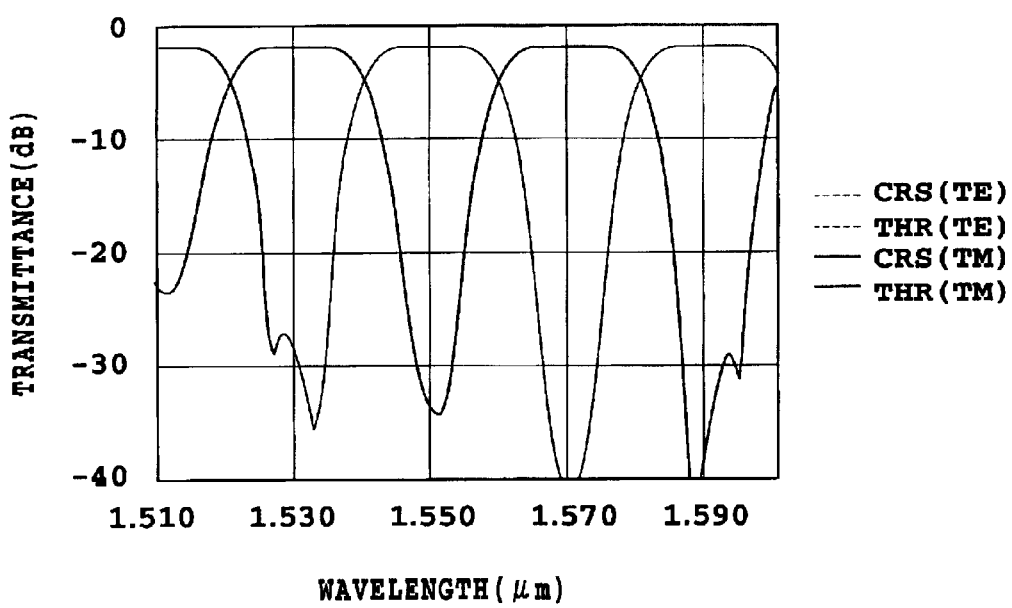
FIG. 36 is a chart showing the transmission spectra of an interleave filter composed of optical couplers using waveguides with a uniform effective index.

FIG. 35 shows the transmission spectra of an interleave filter composed of the optical couplers using the segment waveguides according to this embodiment of the present invention. FIG. 36 shows the transmission spectra of an interleave filter composed of optical couplers using waveguides with a uniform effective index. The optical couplers using the segment waveguides had an insertion loss about 0.4 dB larger than that of the optical couplers using the waveguides with the uniform effective index. This is because of a small loss occurring in the segment waveguide portion.

Both interleave filters had a high optical crosstalk of 25 dB or higher. Further, for both interleave filters, substantially no polarization dependence was observed in the transmission spectra. This is because both interleave filters employ optical couplers configured as shown in FIG. 18, so that the branching ratios of the optical couplers in each interleave filter precisely maintain the designed values.

The use of the optical couplers employing the segment waveguides served to reduce the chip size of the CWDM interleave chip to about 60%, while doubling the yield from the same wafer, in spite of a small increase in insertion loss (0.4 dB). The chip cost of the optical waveguide filter is substantially inversely proportional to the yield from one wafer. Therefore, the optical couplers employing the segment waveguides are effective in reducing the chip cost of the CWDM interleave filter to half.

In this embodiment, the optical couplers are produced using silica-based waveguides. However, semiconductor waveguides formed of InP may be used, or waveguides may be produced using organic material such as polymer or inorganic material such as $LiNbO_3$. Further, in this embodiment, the buried waveguides having a rectangular cross section are used. However, similar effects may be produced using diffused waveguides.

In this embodiment, the segment waveguides are constructed so as to have gaps of 5 µm width formed at the intervals of 25 µm in the traveling direction of propagating light. The waveguides may have a structural change in the direction perpendicular to the traveling direction of propagating light. Alternatively, for example, the waveguides may be constructed so that the core is formed like a zigzag lattice. Alternatively, similar effects may be produced by segmenting optical waveguides of different materials having the respective refractive indices.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A waveguide-type optical signal processing circuit having lattice-form circuits each comprising optical couplers and delay circuits alternately cascaded together using optical waveguides each composed of a core formed on a substrate to guide signal light and a clad arranged around the core and having a lower refractive index than the core, the delay circuit being connected to the corresponding optical coupler and composed of two arms, the lattice-form circuit comprising an input waveguide connected to the leading optical coupler and an output waveguide connected to the trailing optical coupler connected to the last delay circuit, wherein the said series of lattice-form circuits are arranged in a form in which two spirals are combined together on said substrate so as not to cross each other and coupled together in the middle thereof, wherein said optical waveguides, each of which is composed of two arms, are arranged so as to extend halfway around said respective spirals, and wherein an end of the input waveguide which is not connected to said leading optical coupler and an end of the output waveguide which is not connected to said trailing optical coupler extend outward from said spirals.

2. A waveguide-type optical signal processing circuit as claimed in claim 1, wherein one of said two spirals is composed of an input waveguide, an optical coupler, and a delay circuit, and the other is composed of an output waveguide.

3. A waveguide-type optical signal processing circuit as claimed in claim 1, wherein one of said two spirals is an input waveguide, and the other is composed of an optical coupler, a delay circuit, and an output waveguide.

4. A waveguide-type optical signal processing circuit as claimed in claim 1, wherein two of said optical couplers located at the respective ends of one delay circuit are arranged opposite each other across the center of said spirals, and all optical couplers are arranged in a line.

5. A waveguide-type optical signal processing circuit as claimed in claim 1, wherein one of said two spirals is composed of a first lattice-form circuit, while the other is composed of a second and third lattice-form circuits, and an output waveguide of said first lattice-form circuit is connected to input waveguides of said second and third lattice-form circuits.

6. A waveguide-type optical signal processing circuit as claimed in claim 5, wherein two of said optical couplers located at the respective ends of one delay circuit are arranged opposite each other across the center of said spirals, and all optical couplers are arranged in a line.

7. A waveguide-type optical signal processing circuit as claimed in claim 1, wherein said optical couplers have a first and second optical waveguides and four directional couplers formed by arranging said first and second optical waveguides close to each other, wherein said optical couplers are configured so as to couple together signal lights with a wavelength λ which are incident on said first and second optical waveguides or branch a signal light with the wavelength λ which is incident on said first or second optical waveguide, and wherein said optical couplers are configured so that for an optical path length difference ΔL1 for said first and second optical waveguides between the first and second directional couplers with respect to said signal light incidence side, an optical path length difference ΔL2 for said first and second optical waveguides between the second and third directional couplers with respect to said signal light incidence side, and an optical path length difference ΔL3 for said first and second optical waveguides between the third and fourth directional couplers with respect to said signal light incidence side, ΔL1=−ΔL3=λ/4 and |ΔL2|<2λ.

8. A waveguide-type optical signal processing circuit as claimed in claim 7, wherein at least one of said first and second waveguides between said directional couplers comprises a segment waveguide so as to obtain said optical path length differences.

* * * * *